US011228991B2

(12) United States Patent
Anand et al.

(10) Patent No.: US 11,228,991 B2
(45) Date of Patent: Jan. 18, 2022

(54) LINK AUTO-NEGOTIATION BETWEEN A RADIO EQUIPMENT CONTROLLER (REC) AND RADIO EQUIPMENT (RE) IN AN ETHERNET-BASED FRONTHAUL NETWORK

(71) Applicant: Cisco Technology, Inc., San Jose, CA (US)

(72) Inventors: Prashant Anand, Bangalore (IN); Manoj Kumar, Bangalore (IN); Sudhir Kayamkulangara, Bangalore (IN); Dinuraj K, Bangalore (IN); Manigandan Boopalan, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/435,946

(22) Filed: Jun. 10, 2019

(65) Prior Publication Data

US 2020/0252889 A1 Aug. 6, 2020

(30) Foreign Application Priority Data

Feb. 1, 2019 (IN) .............................. 201941003988

(51) Int. Cl.
*H04W 56/00* (2009.01)
*H04W 28/22* (2009.01)
(Continued)

(52) U.S. Cl.
CPC ....... *H04W 56/0005* (2013.01); *H04W 28/22* (2013.01); *H04W 56/001* (2013.01); *H04W 76/10* (2018.02); *H04W 84/20* (2013.01)

(58) Field of Classification Search
CPC ... H04W 56/001; H04W 28/22; H04W 76/10; H04W 84/20; H04W 56/0015;
(Continued)

(56) References Cited

U.S. PATENT DOCUMENTS 7,339,902 B2 * 3/2008 Tung .................. H04B 7/15557
370/279
9,313,827 B2 4/2016 Ilyadis
(Continued)

FOREIGN PATENT DOCUMENTS

EP 3468298 A1 4/2019
JP 2014096633 A 5/2014
(Continued)

OTHER PUBLICATIONS

Antonio de la Oliva et al., "An overview of the CPRI specification and its application to C-RAN based LTE scenarios", https://ieeexplore.ieee.org/document/7402275, Feb. 11, 2016, 7 pages.
(Continued)

*Primary Examiner* — Un C Cho
*Assistant Examiner* — Lalita W Pace
(74) *Attorney, Agent, or Firm* — Edell, Shapiro & Finnan, LLC

(57) ABSTRACT

Techniques that provide link auto-negotiation between a radio equipment controller (REC) and a radio equipment (RE) are described herein. In one embodiment, a method includes performing, by a proxy master, a Common Public Radio Interface (CPRI) Layer 1 (L1) link auto-negotiation with a RE to achieve a L1 synchronization between the proxy master and the RE at a link bit rate; communicating the link bit rate from the proxy master to a proxy slave; performing, by the proxy slave, a CPRI L1 link auto-negotiation with a REC to determine whether a L1 synchronization between the proxy slave and the REC is achieved, wherein if the L1 synchronization is achieved, the link bit rate is a common matching link bit rate achieved; and upon the common matching link bit rate being achieved, establishing a CPRI link between the REC and the RE using the common matching link bit rate.

20 Claims, 8 Drawing Sheets

(51) Int. Cl.
*H04W 76/10* (2018.01)
*H04W 84/20* (2009.01)

(58) Field of Classification Search
CPC ............ H04W 56/002; H04W 28/0257; H04L 25/0262; H04L 5/0064
See application file for complete search history.

(56) References Cited

U.S. PATENT DOCUMENTS

| | | | |
|---|---|---|---|
| 9,692,514 B2 | 6/2017 | Laraqui | |
| 2004/0208180 A1* | 10/2004 | Light | H04L 1/0009 370/395.2 |
| 2005/0232643 A1* | 10/2005 | Aronson | H04B 10/40 398/183 |
| 2007/0025301 A1* | 2/2007 | Petersson | H04L 47/14 370/338 |
| 2008/0232290 A1* | 9/2008 | Elzur | H04L 12/12 370/311 |
| 2010/0291955 A1 | 11/2010 | Sattele | |
| 2011/0182255 A1 | 7/2011 | Kim et al. | |
| 2012/0052878 A1 | 3/2012 | Sakama | |
| 2012/0057572 A1 | 3/2012 | Evans et al. | |
| 2012/0113972 A1* | 5/2012 | Liu | H04W 88/085 370/338 |
| 2012/0307713 A1* | 12/2012 | Watanabe | H04W 88/12 370/315 |
| 2013/0100948 A1 | 4/2013 | Irvine | |
| 2014/0192796 A1* | 7/2014 | Zhang | H04W 28/0205 370/350 |
| 2014/0198684 A1 | 7/2014 | Gravely et al. | |
| 2014/0241186 A1 | 8/2014 | Garcia | |
| 2015/0131643 A1 | 5/2015 | Oren | |
| 2015/0146626 A1* | 5/2015 | Sinha | H04W 16/18 370/329 |
| 2015/0207714 A1* | 7/2015 | Ruffini | H04J 3/065 370/350 |
| 2015/0236785 A1 | 8/2015 | Lamb et al. | |
| 2015/0249549 A1 | 9/2015 | Martinotti et al. | |
| 2015/0304971 A1* | 10/2015 | Shor | H04L 7/033 370/350 |
| 2016/0087446 A1 | 3/2016 | Zainaldin et al. | |
| 2016/0277964 A1 | 9/2016 | Xu et al. | |
| 2017/0063491 A1 | 3/2017 | Bruckman et al. | |
| 2017/0127363 A1 | 5/2017 | Tamamoto et al. | |
| 2017/0324657 A1 | 11/2017 | Zhong | |
| 2018/0049147 A1* | 2/2018 | Chen | H04W 56/0015 |
| 2018/0070246 A1 | 3/2018 | Jack et al. | |
| 2018/0310199 A1 | 10/2018 | Halabian et al. | |
| 2018/0310331 A1 | 10/2018 | Ostberg et al. | |
| 2020/0221342 A1 | 7/2020 | Zhang | |

FOREIGN PATENT DOCUMENTS

| | | | |
|---|---|---|---|
| WO | 2018001143 A1 | 1/2018 | |
| WO | 2018/104175 A1 | 6/2018 | |
| WO | 2018103083 A1 | 6/2018 | |
| WO | 2018189726 A1 | 10/2018 | |
| WO | 2019/045607 A1 | 3/2019 | |

OTHER PUBLICATIONS

Texas Instruments Wiki, "CPRI Protocol", http://processors.wiki.ti.com/index.php/CPRI_Protocol, Aug. 25, 2009, 6 pages.

Ericsson AB, Huawei Technologies Co. Ltd, NEC Corporation, Alcatel Lucent, and Nokia Networks, "Common Public Radio Interface (CPRI); Interface Specification", CPRI Specification V7.0, Oct. 9, 2015, 128 pages.

Richard Maiden, "IEEE1914.3™ Standard for Radio over Ethernet Encapsulations and Mappings", Oct. 25, 2017, 27 pages.

IEEE, "P1914.1/D5.0, Apr 2019—IEEE Draft Standard for Packet-based Fronthaul Transport Networks", https://ieeexplore.ieee.org/document/8703261, Apr. 25, 2019, 2 pages The Institute of Electrical and Electronics Engineers, Inc., "P1914.3™/D3.2 Draft Standard for Radio over Ethernet Encapsulations and Mappings", Jun. 2018, 76 pages.

The Institute of Electrical and Electronics Engineers, Inc., "P1914.3™/D3 Draft Standard for Radio over Ethernet Encapsulations and Mappings", Jan. 2018, 74 pages.

Paul Hardy, "XCPRI: A Single-Chip CPRI PHY Layer Implemented in the Virtex-II Pro FPGA", Application Note: Virtex-II Pro FPGA Family, May 9, 2017, 27 pages.

Peter K. Cho et al., "PoC of Structure agnostic Radio over Ethernet", Apr. 2017, 23 pages.

International Search Report and Written Opinion in counterpart International Application No. PCT/US2020/015158, dated May 18, 2020, 15 pages.

Non-Final Office Action in U.S. Appl. No. 16/573,162, dated Nov. 14, 2019, 16 pages.

International Search Report and Written Opinion in counterpart International Application No. PCT/US2020/015156, dated May 4, 2020, 17 pages.

Ericsson AB et al., "Common Public Radio Interface (CPRI); Interface Specification", CPRI Specification V7.0, Oct. 9, 2015, 128 pages.

3GPP, "3rd Generation Partnership Project; Technical Specification Group Radio Access Network; Evolved Universal Terrestrial Radio Access (E-UTRA); Base Station (BS) radio transmission and reception (Release 16)", 3GPP TS 36.104 V16.2.0, Jun. 2019, 265 pages.

IEEE Communications Society,"P1914.1™/D3.0 Draft Standard for Packet-based Fronthaul Transport Networks", Nov. 2018, 95 pages.

Eee Communications Society, "IEEE Standard for Radio over Ethernet Encapsulations and Mappings", IEEE Std 1914.3™, Nov. 28, 2018, 77 pages.

Ericsson AB, Huawei Technologies Co. Ltd, NEC Corporation, Alcatel Lucent, and Nokia Networks, "Common Public Radio Interface: eCPRI Interface Specification", eCPRI Specification V2.0, Oct. 5, 2019, 109 pages.

Ericsson AB, Huawei Technologies Co. Ltd, NEC Corporation, Alcatel Lucent, and Nokia Networks, "Common Public Radio Interface: eCPRI Interface Specification", eCPRI Specification V1.2, Jun. 25, 2018, 62 pages.

Ericsson AB, Huawei Technologies Co. Ltd, NEC Corporation and Nokia, "Common Public Radio Interface: eCPRI Interface Specification", eCPRI Specification V2.0 (May 10, 2019), 109 pages.

IEEE, "IEEE Standard for Radio over Ethernet Encapsulations and Mappings", IEEE Std 1914.3™, Oct. 5, 2018, 77 pages.

Office Action in U.S. Appl. No. 16/435,961, dated Mar. 8, 2021, 55 pages.

Office Action in U.S. Appl. No. 16/435,974, dated Mar. 17, 2021, 54 pages.

Office Action in U.S. Appl. No. 16/435,974, dated May 4, 2021, 59 pages.

International Search Report and Written Opinion in counterpart International Application No. PCT/US2020/015157, dated May 20, 2020, 17 pages.

Kevin Bross, "Control Packets for RoE; tf3_1604_bross_control_packets_1", vol. 802.3, retrieved on Apr. 19, 2016, 28 pages.

* cited by examiner

LINK AUTO-NEGOTIATION BETWEEN A RADIO EQUIPMENT CONTROLLER (REC) AND RADIO EQUIPMENT (RE) IN AN ETHERNET-BASED FRONTHAUL NETWORK

PRIORITY CLAIM

This application claims priority to Indian Provisional Application No. 201941003988, entitled "FRONTHAUL NETWORK SOLUTIONS," filed on Feb. 1, 2019, the disclosure of which application is hereby incorporated by reference in its entirety.

TECHNICAL FIELD

The present disclosure relates to communication systems, in particular, to techniques to provide link auto-negotiation between a radio equipment controller (REC) and radio equipment (RE) in an Ethernet-based fronthaul network.

BACKGROUND

Mobile networking architectures have grown increasingly complex in communication environments. In particular, access network configurations for mobile networking architectures have become more complex. As access network configurations become more complex, facilitating communications among access network elements such as a radio equipment controller and radio equipment becomes more critical. Accordingly, there are significant challenges in facilitating communications between a radio equipment controller and radio equipment in a network.

DESCRIPTION OF EXAMPLE EMBODIMENTS

Overview

Figure 1:
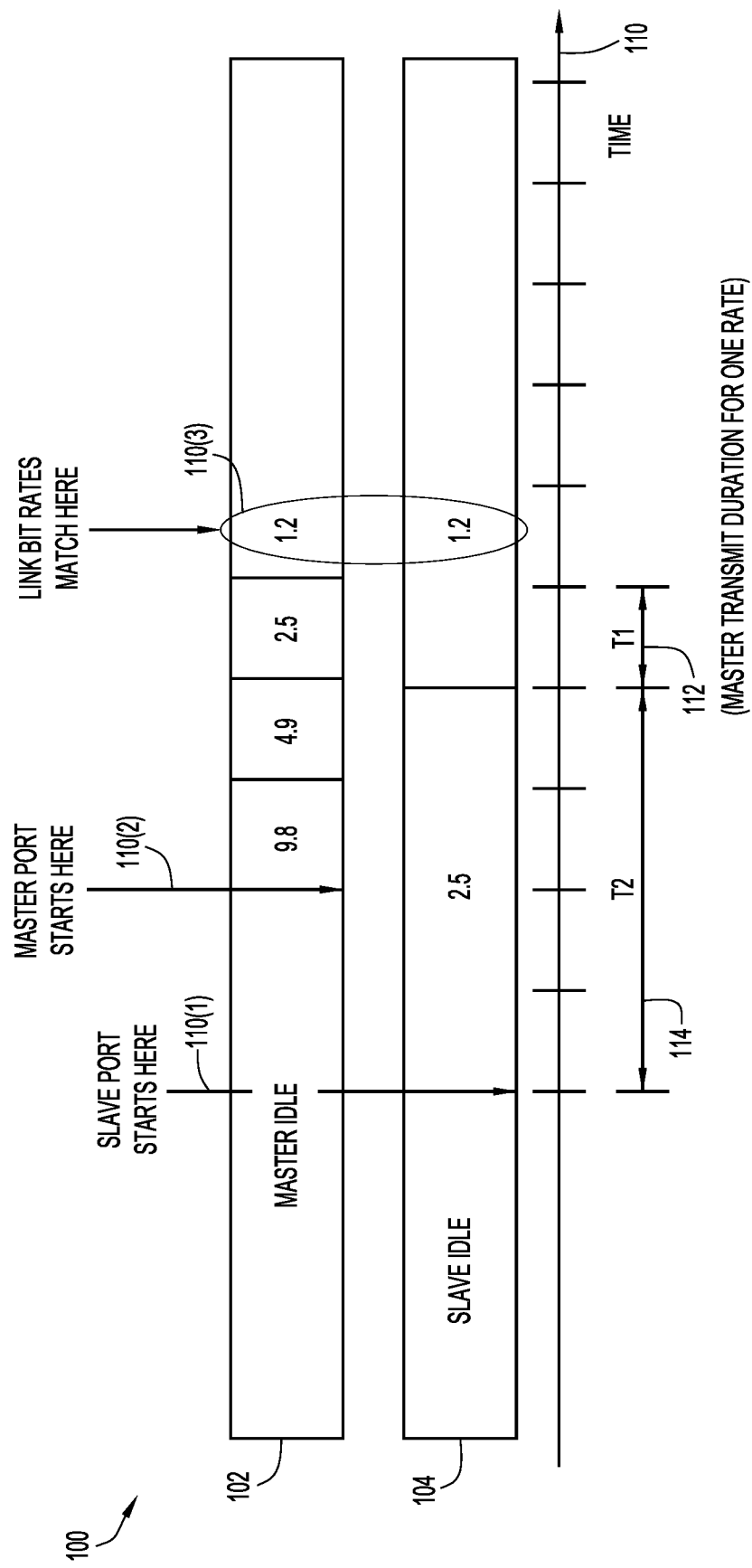
FIG. 1 is a simplified diagram again illustrating example details associated with Common Public Radio Interface (CPRI) link bit rate negotiation.

Provided herein are techniques associated with link auto-negotiation between a radio equipment controller (REC) and a radio equipment (RE) in an Ethernet-based fronthaul network. Using techniques discussed for embodiments described herein, a network operator can deploy Common Public Radio Interface (CPRI)-based REC and RE of varied capabilities in an Ethernet-based fronthaul network and the techniques discussed for embodiments herein can be used to achieve end-to-end CPRI link synchronization between the REC and RE.

In one embodiment, a computer-implemented method is provided and may include (a) performing, by a proxy master, a Common Public Radio Interface (CPRI) Layer 1 (L1) link auto-negotiation with a radio equipment to achieve a L1 synchronization between the proxy master and the radio equipment at a (common matching) link bit rate; (b) communicating the link bit rate from the proxy master to a proxy slave, wherein the communicating is performed via an Ethernet network; (c) performing, by the proxy slave, a CPRI L1 link auto-negotiation with a radio equipment controller to determine whether a L1 synchronization between the proxy slave and the radio equipment controller is achieved using the link bit rate received from the proxy master, wherein if the L1 synchronization is achieved between the proxy slave and the radio equipment controller, the link bit rate is a common matching link bit rate achieved among the radio equipment controller, the proxy slave, the proxy master, and the radio equipment; and (d) upon the common matching link bit rate being achieved, establishing a CPRI link between the radio equipment controller and the radio equipment using the common matching link bit rate.

In some cases, based on determining that the L1 synchronization between the proxy slave and the radio equipment controller is not achieved using the link bit rate, the method may further include communicating an indication from the proxy slave to the proxy master via the Ethernet network that the L1 synchronization between the proxy slave and the radio equipment controller was not achieved; and repeating (a), (b), and (c) using a plurality of other link bit rates until the common matching link bit rate is achieved among the radio equipment controller, the proxy slave, the proxy master, and the radio equipment.

Example Embodiments

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. Internet Protocol (IP) addresses discussed herein and in the claims can include IP version 4 (IPv4) and/or IP version 6 (IPv6) addresses. For example, various Layer 1 (L1) and/or Layer 2 (L2) communications/operations may be referenced herein.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, operations, etc. for a network and/or network element or node.

In general, 3rd Generation Partnership Project (3GPP) mobile network architectures such as 3GPP Long Term Evolution (LTE) architectures, sometimes referred to as 4th Generation (4G)/LTE architectures, as well as 3GPP 5th Generation (5G) architectures can be implemented via a core network and one or more 3GPP access networks in which user equipment (UEs) connect to a core network via over-the-air Radio Frequency (RF) communications with radio units or radio equipment (RE) of the access networks. Some 3GPP access networks can be implemented in a configuration that includes a radio equipment controller (REC) that interfaces with the core network and also interfaces with one or more RE. Both the REC and RE are two basic building blocks of a radio base station. The REC is concerned with the Network Interface transport, the radio base station control and management as well as the digital baseband processing. The RE provides the analogue and radio frequency functions via a radio head such as filtering, modulation, frequency conversion and amplification or, more generally, RE serves as the air interface, to the user equipment.

In current deployments of co-located REC and RE, the Common Public Radio Interface (CPRI) is used as directly connected bi-directional point-to-point over fiber. In general, CPRI is a point to point bit synchronous serial data link between the co-located REC and the RE providing an 'always ON constant bit rate' steady data stream. As referred to herein, the terms 'data link' and 'link' can be used interchangeably.

Referring to FIG. 1, FIG. 1 is a simplified diagram 100 illustrating example details associated with CPRI link bit rate negotiation. FIG. 1 illustrates the transmit link bit rates 102 for a CPRI bit stream transmitted by the master port (REC) and receive/decode link bit rates 104 at which a slave port (RE) attempts to receive and decode the master port (REC) transmitted CPRI bit stream in relation to times 110(1)-110(3), as represented along a time axis 110.

A CPRI link auto-negotiation is performed to negotiate a common matching link bit rate for establishing the bi-directional CPRI data link between co-located REC and RE. CPRI Specification version 7.0 (v7.0), published Oct. 9, 2015, describes the current procedure for link auto-negotiation between REC and RE in direct connected deployments, in which the master port (REC) drives the link bring-up with the slave port (RE) and link bit rate auto-negotiation, L1 synchronization, and frame synchronization/alignment all happen together directly between the co-located REC and RE. For CPRI Specification v7.0, bit rate is referred to as 'line bit rate'; however, for purposes of discussions herein, the term 'link bit rate' will be used. Further as referred to herein, the terms 'link auto-negotiation', 'link negotiation', and 'link bit-rate negotiation', may be used interchangeably. Further as referred to herein, the terms 'synchronization' and 'sync' may be used interchangeably.

CPRI L1 synchronization accomplishes two things between the master and slave ports: byte alignment and hyper frame alignment for CPRI bit streams transmitted via the data link between the co-located REC and RE at a common matching link bit rate for the master and slave. Following frame synchronization/alignment, negotiations associated with protocol setup and control and management (C&M) setup, also referred to as L2 negotiations, are performed to determine a highest common matching link bit rate for the master and slave (if not already selected during the L1 sync) and also to determine a CPRI (in-band) C&M channel bit rate, C&M protocol, and vendor specific negotiations/signaling.

Current CPRI Link Auto-Negotiation:

The following procedure is used to arrive at a common matching link bit rate as per CPRI Specification v7.0:

Master Port Actions:

1. The master port starts to transmit a CPRI bit stream at the highest available link bit rate directly and also starts to attempt receiving a CPRI bit stream (e.g., from the slave port) at the same link bit rate. If the frame alignment is not reached with the slave port, it selects the next highest link bit rate from its rate table (e.g., capability set) for transmission after a T1 time interval (0.9-1.1 seconds), if available.

2. Each following T1 time interval, a new link bit rate is chosen for transmission and reception (if available).

3. The link bit rates are selected from the available set in a round robin fashion, i.e. the first highest, the second highest, and so on to the slowest, and then restarting from the highest link bit rate.

Slave Port Actions:

1. The slave port starts attempting to receive a CPRI bit stream (e.g., from the master port) at the highest available link bit rate directly. If the frame alignment is not reached with master port, it selects another link bit rate for CPRI bit stream reception after a T2 time interval (3.9-4.1 seconds), if available.

2. Each following T2 time interval, a new reception link bit rate is chosen for reception (if available).

3. The link bit rates are selected from an available set (sometimes referred to as a 'capability set') in a round robin fashion, i.e. the first highest, the second highest, and so on to the slowest, and then restarting from the highest link bit rate.

4. When the slave port reaches a Hyper Frame Number (HFN) sync it starts transmitting a CPRI bit stream toward the master port on the same link bit rate. As prescribed by CPRI Specification v7.0, HFN sync is achieved by a CPRI port upon four consecutive successful detections of a SYNC byte in a CPRI bit stream received by the CPRI port. When the master port is able to receive and decode the slave port transmitted CPRI bit stream (e.g., achieve HFN sync), since the master port is also tuned at the same link bit rate, the link negotiations are considered complete and L1 synchronization is achieved as both nodes are able to communicate with each other now.

The above 7 steps are repeated until a common link bit rate match is achieved between the co-located REC and RE.

Consider an example as illustrated in FIG. 1. If the master port (REC) has a capability set in which it is capable of {9.8, 4.9, 2.5, and 1.2} Gigabits per second (Gbps) CPRI link bit rates and the slave port (RE) is capable of {2.5 and 1.2} Gbps CPRI link bit rates, the following occurs:

Master port starts transmitting a CPRI bit stream at a time 110(2) and changes it's transmit link bit rate 102 after every T1 (09-1.1. seconds) time interval 112.

Slave port starts attempting to receive/decode at a time 110(1) (earlier than the time 110(2) at which the master port starts transmitting) and changes its receive/decode link bit rate 104 after every T2 (3.9-4.1 seconds) time interval 114.

Both continue until a matching link bit rate is found and HFN sync is achieved, as shown at a time 110(3).

While the link negotiation procedure can be performed according CPRI Specification v7.0 when the REC and RE are co-located and directly connected, the procedure cannot work in fronthaul networks in which the REC and RE are interconnected through one or more intermediate nodes via a packet-based network, such as an Ethernet network.

The presence of the intermediate nodes in a fronthaul network poses a discontinuity problem for establishing the CPRI link negotiation (e.g., comprising link bit rate negotiation, L1 synchronization, and frame synchronization/alignment) between the REC and RE using the process prescribed by CPRI Specification v7.0. In fronthaul networks, the REC and RE endpoints cannot communicate directly with each other due to presence of CPRI interfacing Ethernet nodes as all these nodes may be running at different rates. Without having a commonly understandable CPRI link bit rate across the entire CPRI path for the CPRI interfacing nodes, the end-to-end CPRI link negotiation cannot be achieved.

Fronthaul Nomenclature

In a fronthaul network, the REC and RE do not interact directly; rather Ethernet nodes capable of CPRI mapping and de-mapping (e.g., mapping and de-mapping between a CPRI bit stream and Ethernet frames and vice-versa, depending on the direction of communications, discussed in further detail below) interface with the REC and RE. The Ethernet node capable of CPRI mapping/de-mapping connected directly to the REC is referred to herein as a 'Proxy Slave' or a 'CPRI Proxy Slave' and the Ethernet node capable of CPRI mapping/de-mapping connected directly to the RE is referred to herein as a 'Proxy Master' or a 'CPRI Proxy Master'. The Proxy Master and the Proxy Slave nodes may be referred to generally as 'proxy nodes'.

In a typical fronthaul network, the Proxy Master and Proxy Slave can communicate over a packet-based network, such as an Ethernet network, using Radio over Ethernet (RoE) communications, as prescribed by the Institute of Electrical and Electronics Engineers (IEEE) 1914.1 and IEEE 1914.3 Specifications, approved Sep. 27, 2018. IEEE 1914.1 and 1914.3 (referred to herein as 'IEEE 1914 standards') provide standards for encapsulation and mapping/de-mapping of radio data, such as CPRI bit streams, and/or potentially control and/or management packets within Ethernet frames. For a given Ethernet frame, radio data and/or potentially control and/or management packets can be included within a RoE frame that is encapsulated in the Ethernet frame. As discussed in further detail herein, a RoE frame can include an RoE header and an RoE payload.

The IEEE 1914 standards define different RoE mappers/de-mappers, including: structure-aware, structure-agnostic, and native mode in which structure-aware mapping/de-mapping operations can be used for CPRI data, structure-agnostic mapping/de-mapping operations can be used for any digitized radio data, and native mode mapping/de-mapping operations can be used for digitized radio In-phase/Quadrature (I/Q) payload data.

The structure-agnostic RoE mapper is considered for embodiments described herein. While the IEEE 1914.1 and IEEE 1914.3 Specifications provide standards for encapsulation and mapping of CPRI bit streams over packet-based fronthaul transport networks, the standards do not cover how end-to-end link negotiations can be performed between an REC and RE in fronthaul networks.

Further, current CPRI link negotiation processes as prescribed by CPRI Specification v7.0 will not work in fronthaul networks. Recall, the key points for end-to-end CPRI link negotiation as prescribed by CPRI Specification v7.0 are:

1. That the HFN sync shall be achieved directly between REC and RE.

2. That the current non-fronthaul CPRI negotiation is a probabilistic method as the slave and master attempt different link rates at the same time. Rates are changed at both ends after different intervals; the master changes the link rate for transmission every 0.9-1.1 seconds and the slave changes the link rate for reception every 3.9-4.1 seconds. Using the method as prescribed by CPRI Specification v7.0 for a non-fronthaul network, both tend to reach at a common match. If the match does not happen in one iteration of 3.9-4.1 seconds, the procedure is repeated again.

However, in a fronthaul network, when using current CPRI link negotiation processes as prescribed by CPRI Specification v7.0, the following can occur:

1. The REC will start at one rate and the Proxy Slave will engage in local CPRI negotiations with the REC. A common match will be found during this negotiation. However, the Proxy Slave still needs to involve the RE in this process.

2. At this stage, the Proxy Slave will start communications towards the Proxy Master (and the RE) using the same rate. The problem here is that the Proxy Master is also not tuned for this rate at this point.

3. Say, for example, that the Proxy Master also tunes to this same rate using some out-of-band control channel communication with the Proxy Slave, the Proxy Master then needs to involve RE in this procedure. The time taken in this communication is a key variable affecting the whole end-to-end negotiation.

4. At this stage, the Proxy Master will first need to ensure that this above rate is supported at the RE using the same CPRI link negotiation procedure.

5. Carrying out the steps 2-4 will take time and due to the delay, what will happen is that the REC (the original Master) will have moved to a different bit rate already by the time the Proxy Slave and the RE reaches a common rate. Thus, this whole procedure will be repeated again and again. It should be noted that there is only the prescribed window of 0.9-1.1 seconds in which steps 2-4 need to be carried out in order for the HFN sync to be achieved between REC and RE, otherwise the overall negotiation may not be achieved at all.

One possible solution arriving at a common link rate on all nodes including the REC and RE in the CPRI path flow may be to use a manual static configuration at all CPRI endpoints and the intermediate CPRI interfacing nodes; however, such a solution is error prone, inefficient at times, and not scalable.

Example embodiments described herein provide techniques to overcome these hurdles by providing a mechanism to provide CPRI link auto-negotiation between an REC and an RE in an Ethernet-based fronthaul network. A CPRI link for a fronthaul network is a cross product of CPRI and Ethernet as the end-to-end nodes (REC/RE) use CPRI only to communicate with each other via the proxy nodes, which perform mapping/de-mapping and link monitoring operations. Thus, embodiments described herein may facilitate end-to-end CPRI link auto-negation and synchronization between an REC and an RE in which the REC represents one end and the RE represents another end of the end-to-end CPRI link auto-negotiation and synchronization.

Figure 2:
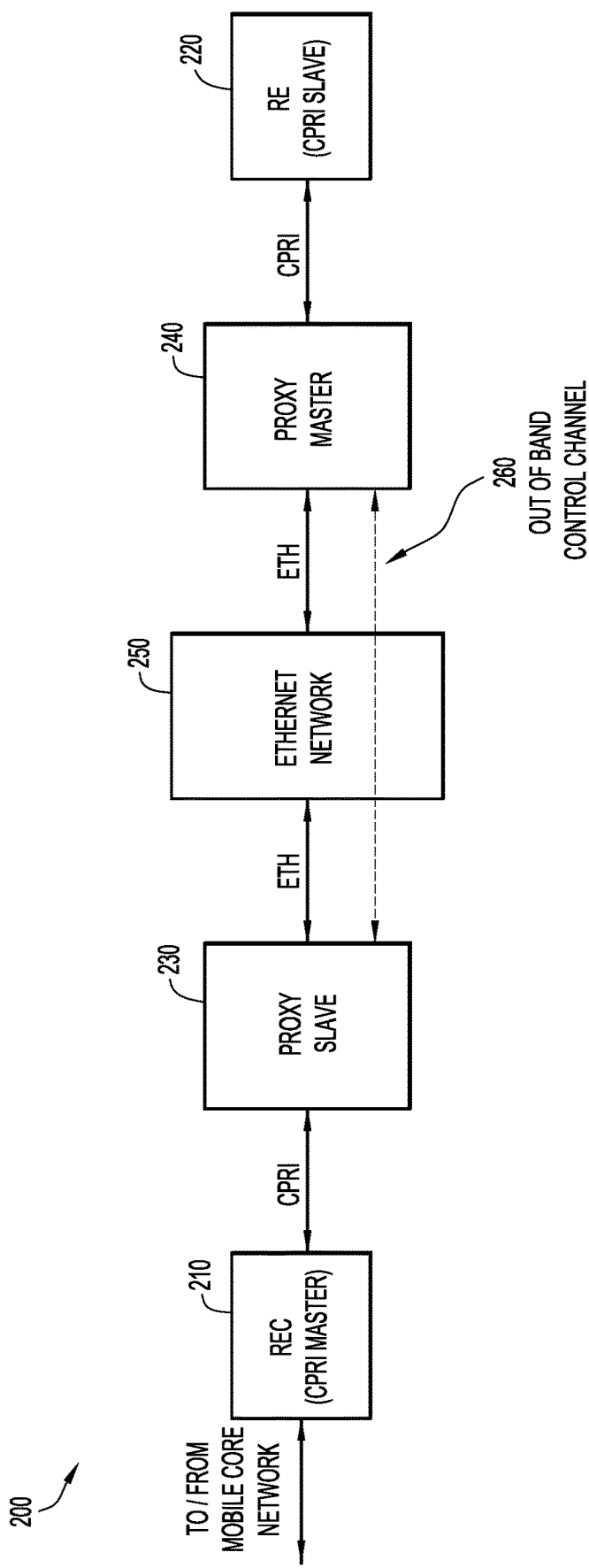
FIG. 2 is a simplified diagram illustrating example details associated with an Ethernet-based fronthaul network in which techniques to provide link auto-negotiation between a radio equipment controller and a radio equipment may be implemented, according to an example embodiment.

Referring to FIG. 2, FIG. 2 is a simplified diagram illustrating example details associated with an Ethernet-based fronthaul network 200 in which techniques to provide link auto-negotiation between an REC 210 and RE 220 may be implemented, according to an example embodiment. FIG. 2 includes REC 210, RE 220, a Proxy Slave 230, a Proxy Master 240, and an Ethernet network 250. As referred to herein, REC 210 may also be referred to as the 'CPRI Master' and RE 220 may be referred to as the 'CPRI Slave'. Further as referred to herein, Ethernet-based fronthaul network 200 may be referred to generally as fronthaul network 200.

In at least one embodiment, at least one CPRI interface element/port may be configured for each of Proxy Slave 230 and Proxy Master 240 in which the CPRI port state machine may be configured for the at least one CPRI interface element/port for each of Proxy Slave 230 and Proxy Master 240. In at least one embodiment, at least one Ethernet interface element/port may also be configured for each of Proxy Slave 230 and Proxy Master 24 to facilitate communications via Ethernet network 250.

As illustrated in FIG. 2, the interconnection between REC 210 and Proxy Slave 230 is a CPRI interconnection, the interconnection between Proxy Slave 230 and Ethernet network 250 is an Ethernet interconnection, the interconnection between RE 220 and Proxy Master 240 is a CPRI interconnection, and the interconnection between Proxy Master 240 and Ethernet network 250 is an Ethernet interconnection. REC 210 may further interface with a 3 GPP mobile core network (not shown).

Proxy Slave 230 is an Ethernet node connected directly to REC 210 and also to Ethernet network 250. Proxy Slave 230 is capable of performing CPRI mapping and de-mapping for various communications/operations within fronthaul network 200, as discussed herein. Proxy Master 240 is an Ethernet node connected directly to RE 220 and also to Ethernet network 250. Proxy Master 240 is capable of performing CPRI mapping and de-mapping for various communications/operations, as discussed herein. Proxy Slave 230 and Proxy Master 240 may interface with each other using Ethernet-based communications using Ethernet network 250.

RoE frames encapsulated within Ethernet frames may be utilized for communications of radio data to/from REC 210 and RE 220 in which Proxy Slave 230 and Proxy Master 240 can map/de-map CPRI bit streams to/from RoE frames for communications across Ethernet network 250 and with each of REC 210 and RE 220 (e.g., via the CPRI interconnection between Proxy Slave 230 and REC 210 and also via the CPRI interconnection between Proxy Master 240 and RE 220) to facilitate end-to-end communications between REC 210 and RE 220.

Communications involving RoE frames are referred to herein as 'in-band' RoE communications. Ethernet-based communications between Proxy Slave 230 and Proxy Master 240 may also include 'out-of-band' communications, which may be used to facilitate various link auto-negotiation operations and communications performed by Proxy Slave 230 and Proxy Master 240, as described herein.

As noted above, the structure-agnostic RoE mapper is considered for embodiments described herein. Thus, L1 link auto-negotiation communications between Proxy Master 240 and Proxy Slave 230 as described for embodiments herein cannot be provided within in-band RoE control packets of Ethernet frames using the structure-agnostic RoE mapper.

Accordingly, for L1 link auto-negotiation operations described herein, an out-of-band control channel 260 may be configured between Proxy Slave 230 and Proxy Master 240 to facilitate out-of-band RoE communications between Proxy Slave 230 and Proxy Master 240. In at least one embodiment, a Type-Length-Value (TLV)-based out-of-band control protocol, referred to herein as an out-of-band 'RoE Management protocol', may facilitate communicating various information, parameters, indications, etc. between Proxy Slave 230 and Proxy Master 240 for link auto-negotiation operations discussed herein using out-of-band control channel 260. Thus, by 'out-of-band', it is meant that certain communications between Proxy Slave 230 and Proxy Master 240 used to facilitate various L1 link auto-negotiation operations discussed herein are out-of-band from the in-band RoE frame communications between Proxy Slave 230 and Proxy Master 240 that may be performed according to the IEEE 1914 standards.

In at least one embodiment, operations as discussed herein may provide a method to achieve link auto-negotiation between REC 210 and RE 220 in Ethernet-based fronthaul network 200 may include:

1. Use of the TLV-based out-of-band control protocol (RoE Management Protocol) communications between Proxy Slave 230 and Proxy Master via out-of-band control channel 260 of fronthaul network 200. For example, the CPRI link entity (e.g., CPRI interface logic and CPRI port) on Proxy Slave 230 can send negotiated link parameters to the relevant RoE peer (e.g., Proxy Master 240) using out-of-band TLV-based RoE Management Protocol communications. Similarly, the Proxy Slave 230 will use out-of-band TLV-based RoE Management Protocol communications to communicate synchronization achievement success or failure. Other communications can be provided, as discussed herein.

2. Use of the following multi-step procedure to achieve end-to-end CPRI link synchronization:

Step 1: Proxy Master 240 and RE 220 L1 synchronization;

Step 2: Proxy Master 240 and Proxy Slave 230 communication (via the RoE Management Protocol) about negotiated link bandwidth; and Step 3: Proxy Slave 230 and REC 210 L1 synchronization In at least one embodiment, Steps 1-3 may be performed using various operations, as discussed in (1)-(4), below. Note, the broad, multi-step procedure described via Steps 1-3, above, may align with different operations (1)-(4), as discussed below. In at least one embodiment, operations (1)-(4) may include:

(1) At the RE 220 end, Proxy Master 240 initiates an auto negotiation with RE 220.
  1.1. At some point, Proxy Master 240 arrives at one common matching link bit rate with RE 220 from its capability set.
  1.2. After achieving L1 synchronization with RE 220, Proxy Master 240 resets the CPRI link with RE 220 and sends the negotiated link bit rate to the Proxy Slave 230 node using a TLV-based out-of-band control channel 260 communication.

(2) Proxy Slave 230, on learning the RE 220 side negotiated link bit rate, uses the same link bit rate in link negotiations with REC 210 for ongoing REC 210 initiated L1 synchronization attempts.
  2.1. During the operations at (2), Proxy Slave 230 uses only one link bit rate, the link bit rate that it learnt from the Proxy Master 240, for the L1 synchronization attempts with the REC 210.
  2.2. After achieving the L1 synchronization and transmitting 10 hyper frames, Proxy Slave 230 tears down the link with REC 210 by stopping its transmissions towards REC 210, which will trigger REC 210 to start link re-establishment.
  2.3. At this stage, a common matching and possibly the highest link bit rate is known at REC 210, RE 220, Proxy Slave 230, and Proxy Master 240.

(3) At this stage, based on determining the common matching link bit rate between REC 210, Proxy Slave 230, Proxy Master 240, and RE 220 as per (1) and (2), Proxy Slave 230 only uses this link bit rate to receive the CPRI bit stream from REC 210 when REC 210 starts the link re-establishment and uses this same link bit rate for link auto-negotiations (e.g., as per CPRI Specification v7.0).
  3.1. The Proxy Slave 230 on achieving the byte and frame alignment from the received CPRI bit stream, since both transmitter and receiver rates are matching, sends the CPRI bit stream (after mapping to RoE frames) to Proxy Master 240 via Ethernet network 250.
  3.2. Upon receiving the RoE frames, the Proxy Master 240 de-maps the RoE frames to a CPRI bit stream and plays out (e.g., transmits) the CPRI bit stream to RE 220 using the same link bit rate, which then enables the RE 220 to achieve L1 synchronization eventually using the steps of link auto-negotiation as discussed above per CPRI Specification v7.0, with the original source of the received CPRI bit stream, which is REC 210.

During the operations at (3), Proxy Slave 230 and Proxy Master 240 will act as a passive CPRI mapper and de-mapper, respectively, and allow end-to-end link synchronization operations to be performed between REC 210 and RE 220 as per the process prescribed by CPRI Specification v7.0.

(4) In case operations at 2.2 fail and the L1 synchronization is not achieved between REC 210 and Proxy Slave 230 due to REC 210 not supporting the link bit rate learnt by Proxy Slave 230 from Proxy Master 240 (e.g., discussed at operations 1.2 and 2.1), the below operations can be repeated:
  4.1. Proxy Slave 230 will communicate to Proxy Master 240, using a TLV-based out-of-band control channel 260 communication, to re-initiate the link negotiation between Proxy Master 240 and RE 220 to determine a different link bit rate than the one attempted earlier.
  4.2. Proxy Master 240 will start the re-negotiations from operations at (1) after excluding any earlier negotiated link bit rates between the Proxy Master 240 and the RE 220. A subsequent successful L1 synchronization between Proxy Master 240 and RE 220 should yield a different negotiated link bit rate, which can be used by Proxy Slave 230 to attempt to achieve link synchronization with the REC 210.

In at least one embodiment, the specific roles assumed by Proxy Master 240 and Proxy Slave 230 in the operations at (1) and (2), respectively, for taking an active role in the L1 synchronization and the passive role played by these nodes in the operations at (3) may be implemented as part of an overall end-to-end distributed state machine, which may facilitate link establishment between REC 210 and RE 220 for Ethernet-based fronthaul network 200.

Figure 3:
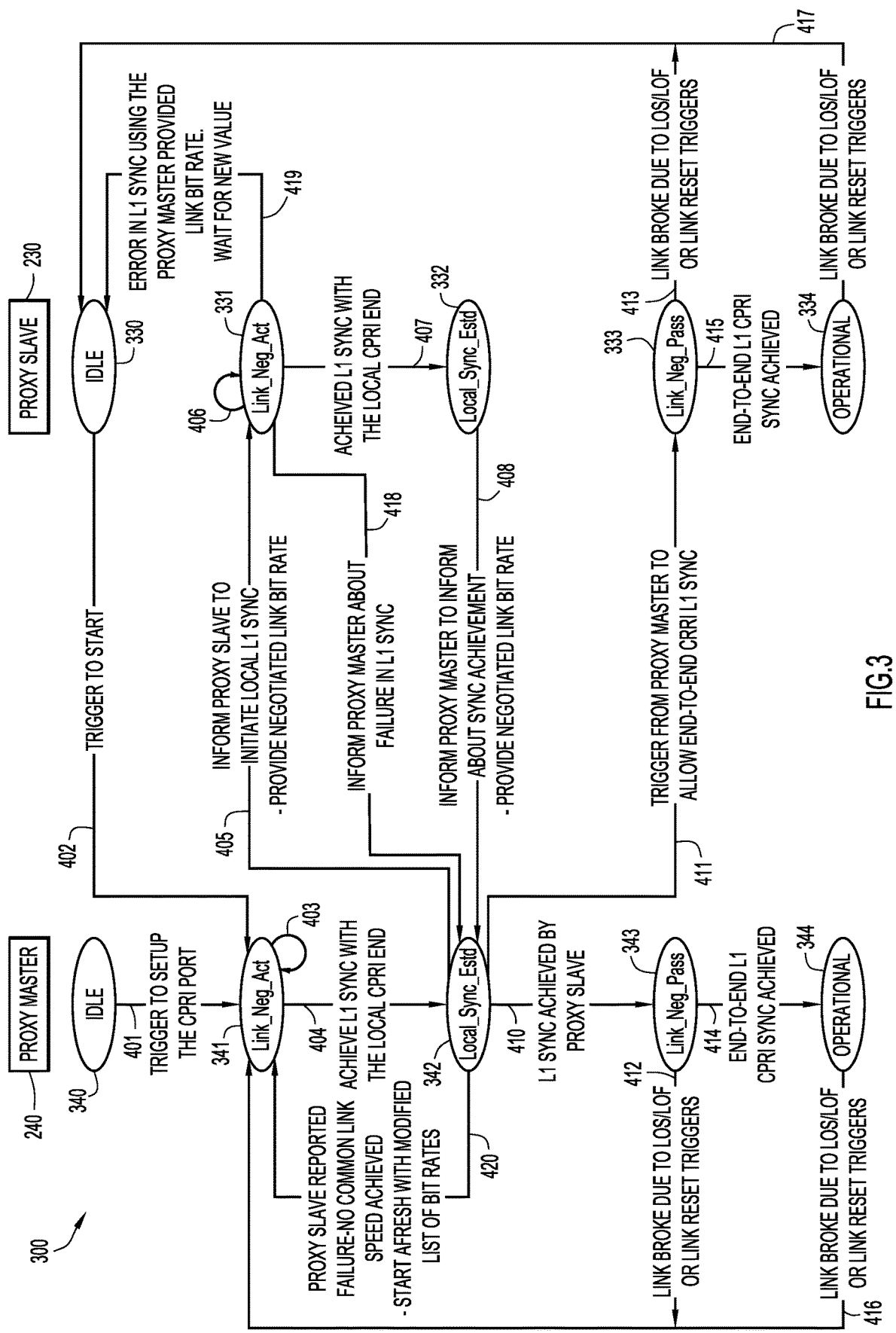
FIG. 3 is a simplified diagram illustrating a distributed state machine for implementing operations to provide link auto-negotiation between the radio equipment controller and radio equipment in the Ethernet-based fronthaul network of FIG. 2, according to an example embodiment.

Referring to FIG. 3, FIG. 3 is a simplified diagram illustrating a distributed state machine 300 for implementing operations 400 to provide link auto-negotiation between REC 210 and RE 220 in Ethernet-based fronthaul network 200, according to an example embodiment. In particular, FIG. 3 illustrates a high-level flow of events and state transitions for link auto-negotiation operations 400 that may be provided via distributed state machine 300. Reference is also made to FIG. 2 in connection with the description of FIG. 3. In at least one embodiment, distributed state machine 300 may be implemented via Proxy Master 240 and Proxy Slave 230 of Ethernet-based fronthaul network 200.

In at least one embodiment, states of distributed state machine 300 implemented via Proxy Master 240 may include: an Idle state 340, a Link_Neg_Act state 341, a Local_Sync_Estd state 342, a Link_Neg_Pass state 343, and an Operational state 344. In at least one embodiment, states of distributed state machine 300 implemented via Proxy Slave 230 may include: an Idle state 330, a Link_Neg_Act state 331, a Local_Sync_Estd state 332, a Link_Neg_Pass state 333, and an Operational state 334.

The following states of distributed state machine 300 are considered for both Proxy Master 240 (e.g., associated with states 340-344) and Proxy Slave 230 nodes (e.g., associated with states 330-334):

Idle: Initial state for a proxy node (e.g., Proxy Master 240 or Proxy Slave 230).

Link_Neg_Act: In this state, a proxy node should start the active L1 link negotiations (e.g., as Proxy Master 240 or Proxy Slave 230).

Local_Sync_Estd: This state indicates that the local L1 synchronization is achieved (e.g., between Proxy Master 240 and RE 220 or between Proxy Slave 230 and REC 210). After reaching the Local_Sync_Estd state 342 of Proxy Master 240, Proxy Master 240 resets the connection (e.g., the CPRI link) with RE 220. After reaching the Local_Sync_Estd state 332 of Proxy Slave 230, Proxy Slave 230 stops transmitting anything toward REC 210.

Link_Neg_Pass: In this state, the proxy nodes (e.g., Proxy Master 240 and Proxy Slave 230) should allow the end-to-end CPRI link negotiation operations to be performed between REC 210 and RE 220. There is no involvement by the proxy nodes other than acting passively by monitoring the end-to-end CPRI link state and performing other normal operations (e.g., mapping/de-mapping, etc.).

Operational: This state is entered when the end-to-end CPRI link is established and bi-directional traffic is flowing between REC 210 and RE 220 via Ethernet network 250. In this state, the nodes (e.g., Proxy Master 240 and Proxy Slave 230) monitor for link faults and perform other normal operations.

The following key steps, which are discussed in further detail below, for operations 400 associated with distributed state machine 300 may include:

1. Proxy Slave 230 initiates the CPRI link bring-up primarily by sending a trigger to Proxy Master 240. Proxy Slave 230 can also indicate to Proxy Master 240 as to what all link bit rates may be considered for L1 sync with RE 220.

2. Proxy Master 240, on its own, can only achieve a local L1 sync with the RE 220.

3. The RoE Management Protocol is used for communication via out-of-band control channel 260 between the Proxy Master 240 and Proxy Slave 230 nodes during the state transitions with parameterized information in the communications.

For operations 400, it is assumed that packet-based communication between Proxy Master 240 and Proxy Slave 230 via Ethernet network 250 is operational and that REC 210 and RE 220 of varied link bit rate capabilities are set up and ready for L1 link negotiation in fronthaul network 200. In at least one embodiment, operations 400 associated with distributed state machine 300 may include at 401, a trigger is initiated to set-up/configure the CPRI port for Proxy Master 240. In various embodiments, the trigger could be user initiated or an automatic configuration performed at power-on/reset and the configuration could be an earlier saved configuration taking effect at power-on/reset. In at least one embodiment, configuring the CPRI port for Proxy Master 240 may include configuring a capability set including a list of CPRI link bit rates that Proxy Master 240 may use to attempt local L1 synchronizations with RE 220.

At 402, the operations may include Proxy Slave 230 communicating (e.g., via out-of-band control channel 260) a trigger to Proxy Master 240 to start link auto-negotiations operations for distributed state machine 300. In at least one embodiment, Proxy Slave 230 can also indicate to Proxy Master 240 as to what all link bit rates may be considered for L1 sync with RE 220. Proxy Slave 230 remains in the Idle state 330 until an indication is received that Proxy Master 240 has achieved local L1 sync with Re 220.

In at least one embodiment, the communication may be sent via a TLV object or a list of TLV objects in a packet, which may include a Type field, a Length field, and a Value field and may be configured as:
Type: Parameter Type
Length: TLV Length
Value: Parameter Value In at least one embodiment, the Type field may be set to a 'Parameter Type', which may be a unique value or other unique indication indicating a unique parameter carried in the TLV. The Length field may be set to the length of the TLV. In at least one embodiment, the Value field can include a Parameter Value, which is the value/indication for the associated Parameter Type. In various embodiments, different Parameter Types may include, but not be limited to: a 'command_L1_sync' type associated with communicating various commands between proxy nodes, such as a trigger to start/re-start of link auto-negotiation operations for distributed state machine 300, a trigger and/or values to start a local L1 synchronization (e.g., sent by Proxy Slave 230 to Proxy Master 240, as discussed below), a trigger to allow end-to-end link negotiations to be performed between the REC and RE (e.g., sent by Proxy Master 240 to Proxy Slave 230, as discussed below), and/or any other commands/values (e.g., abort, etc.); a 'sync_achievement_status' type associated with communicating a local L1 sync achievement or failure status indication (e.g., by Proxy Master 240 or Proxy Slave 230, as discussed below), a 'link_bit_rate' type associated with communicating a link bit rate (e.g., by Proxy Master 240 and/or Proxy Slave 230, as discussed below), combinations thereof, and/or any other Parameter Type indications for different types of parameters, commands, etc. that may be communicated using bi-directional communications between Proxy Master 240 and Proxy Slave 230 via out-of-band control channel 260. In various embodiments, different Parameter Values that may be included in a TLV object or packet may include, but not be limited to: flags, bit strings, text strings, numerical values, lists (e.g., of multiple link bit rates), combinations thereof, and/or any other values and/or information that may be communicated in a TLV. In some embodiments, multiple RoE Management Type TLVs may be sent together in a communication.

These examples of Parameter Types and Parameter Values are provided for illustrative purposes only and are not meant to limit the broad scope of the present disclosure. In various embodiments, any Parameter Types, Parameter Values and/or any other parameters/data/information may be included in out-of-band control channel communications between a Proxy Slave and a Proxy Master.

Referring again to FIG. 3, the out-of-band communication at 402 may, for example, be made using a 'command_L1_sync' type object to communicate the trigger to Proxy Master 240 to start link auto-negotiations operations for distributed state machine 300. At 403, the operations may include Proxy Master 240 attempting, at Link-_Neg_Act state 341, a local L1 synchronization with the local CPRI end (RE 220) via L1 link negotiation operations using the list of CPRI link bit rates configured for Proxy Master 240. The operations at 403 may include Proxy Master 240 performing a local L1 sync with RE 220 using the L1 round-robin synchronization process as prescribed by CPRI Specification v7.0, discussed above.

Upon achieving a local L1 sync with the local CPRI end, the operations include Proxy Master 240 resetting the link with RE 220 and transitioning (404) to the Local_Sync_Estd state 342 at which the operations include Proxy Master 240 sending a communication, at 405, to Proxy Slave 230 to inform Proxy Slave 230 to initiate a local L1 sync attempt with REC 210 using the negotiated link bit rate determined by Proxy Master 240. The communication at 405 may be sent using a TLV-based out-of-band communication (e.g., using a 'command_L1_sync' type TLV object) via out-of-band control channel 260 that indicates the trigger to start the local L1 synchronization at Proxy Slave 230 and also includes the negotiated link bit rate determined by Proxy Master 240.

Upon receiving the communication at 405 and learning the link bit rate from Proxy Master 240, the operations include Proxy Slave 230, at 406, attempting a local L1 synchronization with REC 210 via L1 link negotiation operations using only the link bit rate learned from Proxy Master 240 to attempt receiving the CPRI bit stream from REC 210. On achieving HFN sync in received CPRI stream, the Proxy Slave 230 starts transmitting CPRI bit stream towards the REC 210 using the same link rate. REC 210 can attempt to decode the CPRI bit stream at the link bit rate transmitted by Proxy Slave 230 in order to achieve a local L1 sync with Proxy Slave 230.

A local L1 sync between Proxy Slave 230 and REC 210 may or may not be achieved at 406 using the link bit rate learned from Proxy Master 240. In at least one embodiment, Proxy Slave 230 can determine whether a local L1 sync is achieved with REC 210 based on whether it successfully decodes a CPRI bit stream (e.g., achieves HFN sync for the CPRI bit stream) transmitted from REC 210 to Proxy Slave 230 using the learned bit rate as receiver rate. Post this, the Proxy Slave 230 starts transmitting CPRI to REC 210 on the same link bit rate.

The operations include Proxy Slave 230 tearing down the link with REC 210 by stopping the CPRI bit steam transmitting toward REC 210 after 10 hyper frames and transitioning (407) to the Local_Link_Estd state 332 at which the operations may include Proxy Slave 230 sending a communication, at 408, to Proxy Master 240 to inform Proxy Master 240 about the L1 sync achievement and to provide the negotiated link bit rate at which the L1 sync achievement was received. The communication at 408 may be sent using a TLV-based out-of-band communication (e.g., using a 'sync_achievement_status' type TLV object) via out-of-band control channel 260 that indicates the local L1 sync achievement at Proxy Slave 230 with REC 210 and also includes the negotiated link bit rate (e.g., using a 'link_bit_rate' type TLV object) at which the local L1 sync with REC 210 was achieved by Proxy Slave 230. Upon the Proxy Slave 230 achieving the L1 sync with REC 210, a common matching link bit rate is achieved (known) among the REC 210, the Proxy Slave 230, the Proxy Master 240, and the RE 220.

Based on receiving the communication at 408 indicating local L1 sync by Proxy Slave 230, the operations include Proxy Master 240 transitioning (410) to the Link_Neg_Pass state 343 and Proxy Master 240 sending a communication, at 411, to Proxy Slave 230 to trigger transitioning to the Link_Neg_Pass state 333 to allow end-to-end link negotiation processes to be performed between REC 210 and RE 220. The communication at 411 may be sent using a TLV-based out-of-band communication (e.g., using a 'command_L1_sync' type TLV object) via out-of-band control channel 260 that indicates the trigger for Proxy Slave 230 to transition to the Link_Neg_Pass state 333.

While in the respective Link_Neg_Pass states 343 and 333, Proxy Master 240 and Proxy Slave 230, respectively, allow end-to-end link negotiations to be performed between REC and RE 220. The end-to-end link negotiations may be performed according to the synchronization process as prescribed by CPRI Specification v7.0, starting from the previously negotiated link bit rates for REC 210 and RE 220.

There is no involvement by the proxy nodes in the end-to-end link negotiations while in Link_Neg_Pass states 343, 333 other than acting passively by monitoring the end-to-end CPRI link state to determine whether the link may be broken due to Loss of Signal (LOS) and/or Loss of Frame (LOF) L1 faults being detected or a link reset triggers and also to perform other normal operations (e.g., mapping/de-mapping, etc.) to facilitate communications between REC 210 and RE 220 via Ethernet network 250 for the end-to-end link negotiations.

The Proxy Slave 230 and Proxy Master 240 detect the LOS and LOF alarm conditions on the CPRI links using the procedures specified in the CPRI specification v 7.0. For example, based on detecting a LOS/LOF L1 link fault or a link reset by Proxy Master 240, the operations can include transitioning (412) back to the Link_Neg_Act state 341 for Proxy Master 240 and the link auto-negotiation operations can be performed again. Based on detecting a LOS/LOF link fault or link reset by Proxy Slave 230, the operations can include transitioning (413) back to the Idle state 330 for Proxy Slave 230 and awaiting a communication from Proxy Master 240 (e.g. the communication at 405) informing Proxy Slave 230 to again initiate a local L1 sync attempt with REC 210 using a negotiated link bit rate determined by Proxy Master 240. In some instances, as prescribed by CPRI Specification v7.0, the REC 250 can trigger a reset for the link.

Upon successful end-to-end L1 synchronization between REC 210 and RE 220, the operations can include transitioning at 414 to the Operational state 344 for Proxy Master 240 and at 415 to the Operational state 334 for Proxy Slave 230.

In the respective operational states 344 and 334, Proxy Master 240 and Proxy Slave 230, respectively, can monitor for L1 link faults and perform other normal operations (e.g., mapping/de-mapping, etc.) to facilitate communications between REC 210 and RE 220 via Ethernet network 250. For operations 400, it is assumed that frame synchronization/alignment operations as per CPRI Specification v7.0 and/or any other vendor specific negotiations are performed and completed between the Link_Neg_Pass and Operational states for the CPRI link between REC 210 and RE 220 to be operational.

In some cases, based on detecting a LOS/LOF L1 link fault or a link reset by Proxy Master 240, the operations can include transitioning (416) back to the Link_Neg_Act state 341 for Proxy Master 240 and the link auto-negotiation operations can be performed again. In some cases, based on detecting a LOS/LOF or link reset by Proxy Slave 230, the operations can include transitioning (417) back to the Idle state 330 for Proxy Slave 230 and awaiting a communication from Proxy Master 240 (e.g. the communication at 405) informing Proxy Slave 230 to again initiate a local L1 sync attempt with REC 210 using a negotiated link bit rate determined by Proxy Master 240.

Referring again to the operations at 406 at which Proxy Slave 230 attempts a local L1 synchronization with REC 210 using the link bit rate learned from Proxy Master (via communication 405), based on a determination by Proxy Slave 230 that the local L1 synchronization with REC 210 cannot be achieved using the learned link bit rate, the operations may include Proxy Slave 230 sending a communication, at 418, to Proxy Master 240 informing Proxy Master 240 about the failure in the local L1 sync attempt and transitioning, at 419, back to the Idle state 330 and awaiting another communication from Proxy Master 240 (e.g. another communication at 405) informing Proxy Slave 230 to again initiate a local L1 sync attempt with REC 210 using a new value (e.g., another negotiated link bit rate determined by Proxy Master 240).

The communication at 418 is sent using a TLV-based out-of-band communication (e.g., using a 'sync_achievement_status' TLV type) via out-of-band control channel 260 that indicates the local L1 sync failure at Proxy Slave 230 with REC 210. In some embodiments, the communication at 418 may also include an identification of the link bit rate at which the local L1 sync failed.

Based on receiving the communication at 418, the operations may include Proxy Master 240 transitioning, at 420, back to the Link_Neg_Act state 341 to re-start attempts to achieve another local L1 sync with RE 220 at 403 using a modified list of link bit rates. In at least one embodiment, the modified list of link bit rates may be the original list of link bit rates configured for Proxy Master 240 with any earlier tried link bit rate(s) that have failed local L1 sync between Proxy Slave 230 and REC 210 excluded from the list.

Accordingly, operations 400 provided via distributed state machine 300 may facilitate link auto-negotiation between REC 210 and RE 220 within Ethernet-based fronthaul network 200.

Figure 4:
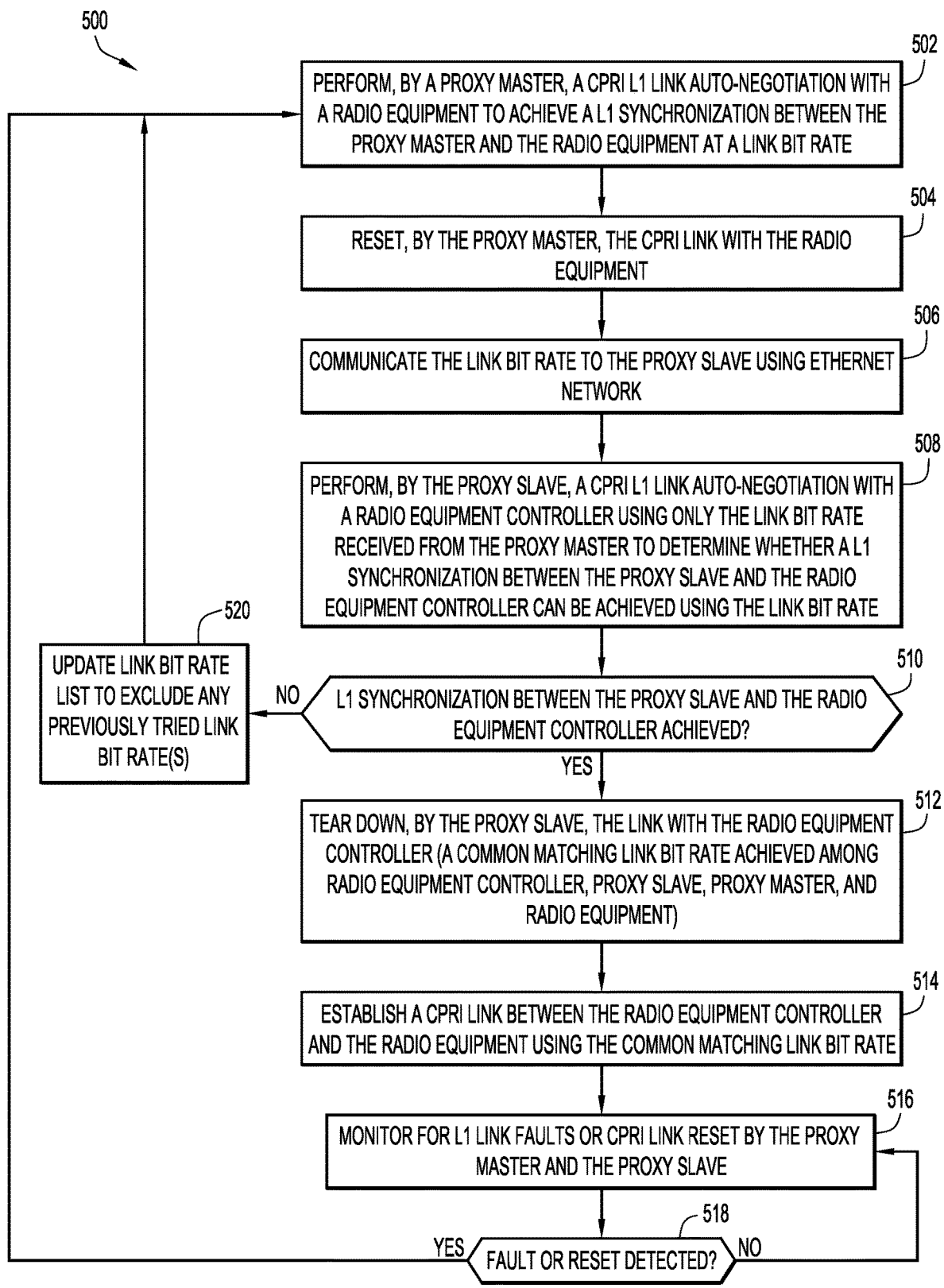
FIG. 4 is a simplified flow chart illustrating example operations that may be performed to provide link auto-negotiation between a radio equipment controller and a radio equipment in an Ethernet-based fronthaul network, according to an example embodiment.

Referring to FIG. 4, FIG. 4 is a simplified flowchart illustrating example operations 500 that may be performed to provide link auto-negotiation between a radio equipment controller and a radio equipment in an Ethernet-based fronthaul network. In at least one embodiment, operations 500 can be performed via a Proxy Master, a Proxy Slave, a radio equipment controller (REC) and a radio equipment (RE) of an Ethernet-based fronthaul network, such as Proxy Master 240, Proxy Slave 230, REC 210, and RE 220 of Ethernet-based fronthaul network 200 as illustrated in FIG. 2.

For operations 500, it is assumed that the Proxy Master is configured with a capability set including a list of link bit rates that can be used for L1 synchronization operations with the RE.

In at least one embodiment, operations 500 may begin at 502, which may include the Proxy Master performing a CPRI L1 link auto-negotiation with the radio equipment to achieve a (local) L1 synchronization between the Proxy Master and the radio equipment at a common matching link bit rate. At 504, the operations may include, after achieving the L1 synchronization with the radio equipment, resetting, by the Proxy Master, the CPRI link with the RE and, at 506, communicating the link bit rate at which the sync was achieved from the Proxy Master to the Proxy Slave using an Ethernet network (e.g., Ethernet network 250). The communicating at 506 may be performed using a TLV-based out-of-band control channel (e.g. out-of-band control channel 260) communication, as discussed for embodiments herein.

At 508, the operations may include the Proxy Slave performing a (local) CPRI L1 link auto-negotiation with the radio equipment Controller using only the link bit rate received from the Proxy Master to determine whether a L1 synchronization between the Proxy Slave and the radio equipment Controller can be achieved using the link bit rate.

At 510, the operations may include the Proxy Slave determining whether the L1 synchronization between the Proxy Slave and the radio equipment Controller is achieved (e.g. based on the Proxy Slave receiving and decoding a CPRI stream transmitted from the radio equipment controller at the link bit rate).

Based on determining at 510 that the L1 synchronization between the Proxy Slave and the radio equipment controller is achieved using the link bit rate, the link bit rate is a common matching link bit rate achieved among the radio equipment controller, the proxy slave, the proxy master, and the radio equipment and the operations can include, at 512, tearing down, by the proxy slave, the link with the radio equipment controller (e.g., stopping CPRI bit stream transmissions towards the radio equipment controller).

In at least one embodiment, the operations at 512 can further include, among others as discussed herein, the Proxy Slave communicating an indication from the Proxy Slave to the Proxy Master that the L1 synchronization between the Proxy Slave and the radio equipment controller was achieved using the link bit rate. At 514, the operations can include establishing a CPRI link between the radio equipment controller and the radio equipment using the common matching link bit rate. In at least one embodiment, the operations at 514 can include the Proxy Master communicating a trigger to the Proxy Slave to transition the Proxy Slave to a passive state (e.g., Link_Neg_Pass state 333) and the Proxy Master also transitioning to a passive state (e.g., Link_Neg_Pass state 343) to allow end-to-end communications between the radio equipment controller and the radio equipment to establish the CPRI link between the radio equipment controller and the radio equipment. In the passive states, the Proxy Master and the Proxy Slave perform normal L1 link monitoring operations, mapping operations, and de-mapping operations to allow end-to-end communications between the radio equipment controller and the radio equipment to establish the CPRI link between the radio equipment controller and the radio equipment.

In at least one embodiment, the (end-to-end) CPRI link synchronization established between the radio equipment controller and the radio equipment may include L1 synchronization using the common matching link bit rate followed by any other CPRI bit stream synchronization/alignment operations (e.g., L2) and/or vendor specific negotiations that may be performed between the radio equipment controller and the radio equipment.

At 516, the operations may include monitoring for any CPRI L1 link faults (e.g., LOS/LOF) or a CPRI link reset by the Proxy Master and the Proxy Slave. At 518, the operations may include determining whether a CPRI L1 link fault or a CPRI link reset is detected. Based on a determination at 518 that a fault or reset is detected, the operations may return to 502 at which the operations 500 may be repeated. Based on a determination at 518 that no fault or reset is detected, the operations may return to 516 at which the Proxy Master and the Proxy slave can continue to monitor for the faults or a link reset.

Referring again to 510, based on determining that the CPRI L1 link synchronization between the Proxy Slave and the radio equipment controller is not achieved using the link bit rate received from the Proxy Master, the operations can include updating, at 520, the link bit rate list for the Proxy Master to exclude any previously tried link bit rate(s) and the operations can return to 502 at which the operations 500 may be repeated using the new link bit rate list for the Proxy Master.

Figure 5:
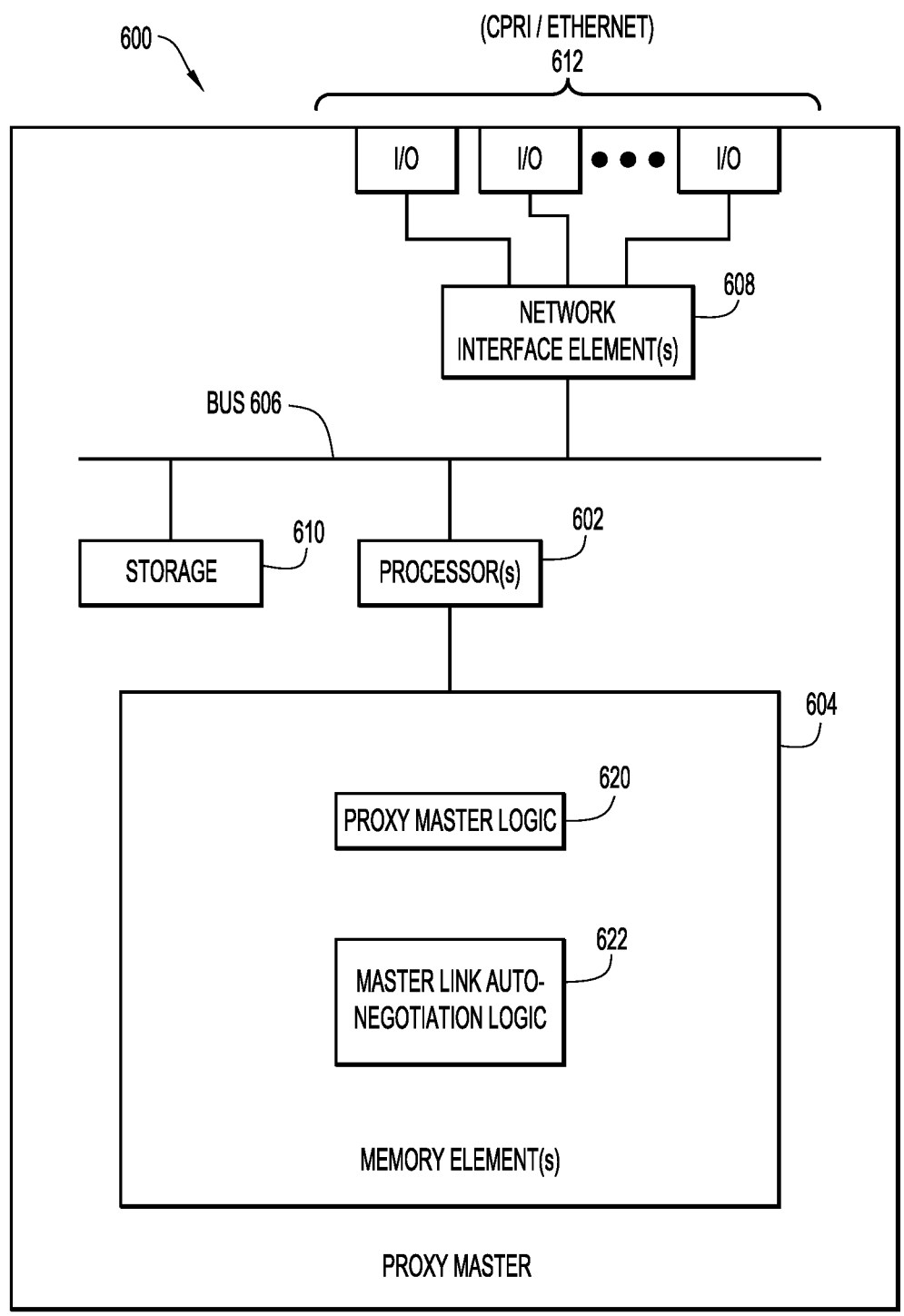
FIG. 5 is a simplified block diagram illustrating example details associated with a Proxy Master node for implementing operations described herein, according to an example embodiment.

Referring to FIG. 5, FIG. 5 is a simplified block diagram illustrating example details associated with a proxy node such as a Proxy Master 600 for implementing operations described herein, according to an example embodiment. Proxy Master 600 may provide operations associated with a Proxy Master within an Ethernet-based fronthaul network as discussed herein such as, for example, Proxy Master 240 of Ethernet-based fronthaul network 200, as illustrated in FIG. 2.

The embodiment of FIG. 5 illustrates Proxy Master 600, which includes one or more processor(s) 602, one or more memory element(s) 604, a bus 606, one or more network interface element(s) 608, and storage 610. Memory element(s) 604 may include instructions for proxy master logic 620 and master link auto-negotiation logic 622.

In at least one embodiment, processor(s) 602 is/are at least one hardware processor configured to execute various tasks, operations, and/or functions for Proxy Master 600 according to software and/or instructions configured for Proxy Master 600. In at least one embodiment, memory element(s) 604 is/are configured to store data, information, software and/or instructions associated with Proxy Master 600 and logic configured for memory element(s) 604. In at least one embodiment, bus 606 can be configured as an interface that enables one or more elements of Proxy Master 600 (e.g., network interface element(s) 608, processor(s) 602, memory element(s) 604 (and logic, etc. configured therein), etc.) to communicate in order to exchange information and/or data, to perform operations, etc. In at least one embodiment, a fast kernel-hosted interconnect may be employed for Proxy Master 600, potentially using shared memory between processes (e.g., logic, etc.), which can enable efficient communication paths between the processes.

In various embodiments, network interface element(s) 608 enables communications (wired or wireless) between Proxy Master 600 and other network elements or nodes, via one or more input/output (I/O) elements 612 (e.g., any number/combination of CPRI ports, Ethernet ports, transceivers, etc.) at which data, information, etc. is received and transmitted to facilitate operations discussed for various embodiments described herein. In various embodiments, network interface element(s) 608 (e.g., hardware, software, firmware, logic, etc.) can be configured to include any combination of Ethernet interface elements, CPRI interface elements, Radio Frequency (RF) interface elements (e.g., for WiFi or any other unlicensed spectrum communications, for 3GPP or any other licensed spectrum communications, and/or or any other similar network interface elements to enable communications (e.g., CPRI bit stream/RoE frame mapping/de-mapping, Ethernet frame encapsulation/de-encapsulation, etc.) for Proxy Master 600 within an Ethernet-based fronthaul network (e.g., Ethernet-based fronthaul network 200). Proxy Master 600 can include any suitable interfaces for receiving, transmitting, and/or otherwise communicating data and/or information in a network environment.

In various embodiments, storage 610 can be configured to store data, information and/or instructions associated with Proxy Master 600 and/or logic configured for memory element(s) 604. Note that in certain examples, storage 610 can be consolidated with memory elements 604 (or vice versa), and/or the storage/memory elements can overlap/exist in any other suitable manner.

In various embodiments, proxy master logic 620 can include instructions that, when executed (e.g., by processor(s) 602) cause Proxy Master 600 to perform operations, which can include, but not be limited to: performing control, management, etc. operations associated with Proxy Master 600 (e.g., for CPRI bit steam/RoE frame mapping/de-mapping operations, Ethernet frame encapsulations/de-encapsulations, monitoring operations, and/or any other normal operations); cooperating and/or interacting with other logic (internal and/or external to Proxy Master 600) and/or network interface element(s) 608 (e.g., for CPRI bit stream/RoE frame mapping/de-mapping operations, Ethernet frame encapsulations/de-encapsulations, monitoring operations, and/or any other normal operations); maintaining and/or interacting with stored data, information, and/or parameters (e.g., link bit rates); combinations thereof; and/or the like to facilitate operations as discussed for various embodiments described herein.

In various embodiments, master link auto-negotiation logic 622 may include instructions that, when executed (e.g., by processor(s) 602) may facilitate various link auto-negotiation operations described herein including, but not limited to: operations associated with distributed state machine 300 for a Proxy Master; sending/receiving out-of-band communications as a Proxy Master via the RoE Management Protocol described herein; cooperating and/or interacting with other logic (internal and/or external to Proxy Master 600) and/or network interface element(s) 608; maintaining and/or interacting with stored data, information, and/or parameters; combinations thereof; and/or the like to facilitate operations as discussed for various embodiments described herein.

In various embodiments, memory element(s) 604 may include any suitable memory element such as random access memory (RAM), dynamic RAM (DRAM), static RAM (SRAM), and/or cache memory. In general, memory element(s) 604 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 610 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of non-transitory tangible media and/or non-transitory computer readable storage media, that is capable of storing program/logic/software instructions and/or digital information. In some embodiments, the media used by storage 610 may also be removable. For example, a removable hard drive may be used for storage 610. Other examples include optical and magnetic disks, thumb drives, and smart cards that are inserted into a drive for transfer onto another computer readable storage medium that is also part of storage 610.

Figure 6:
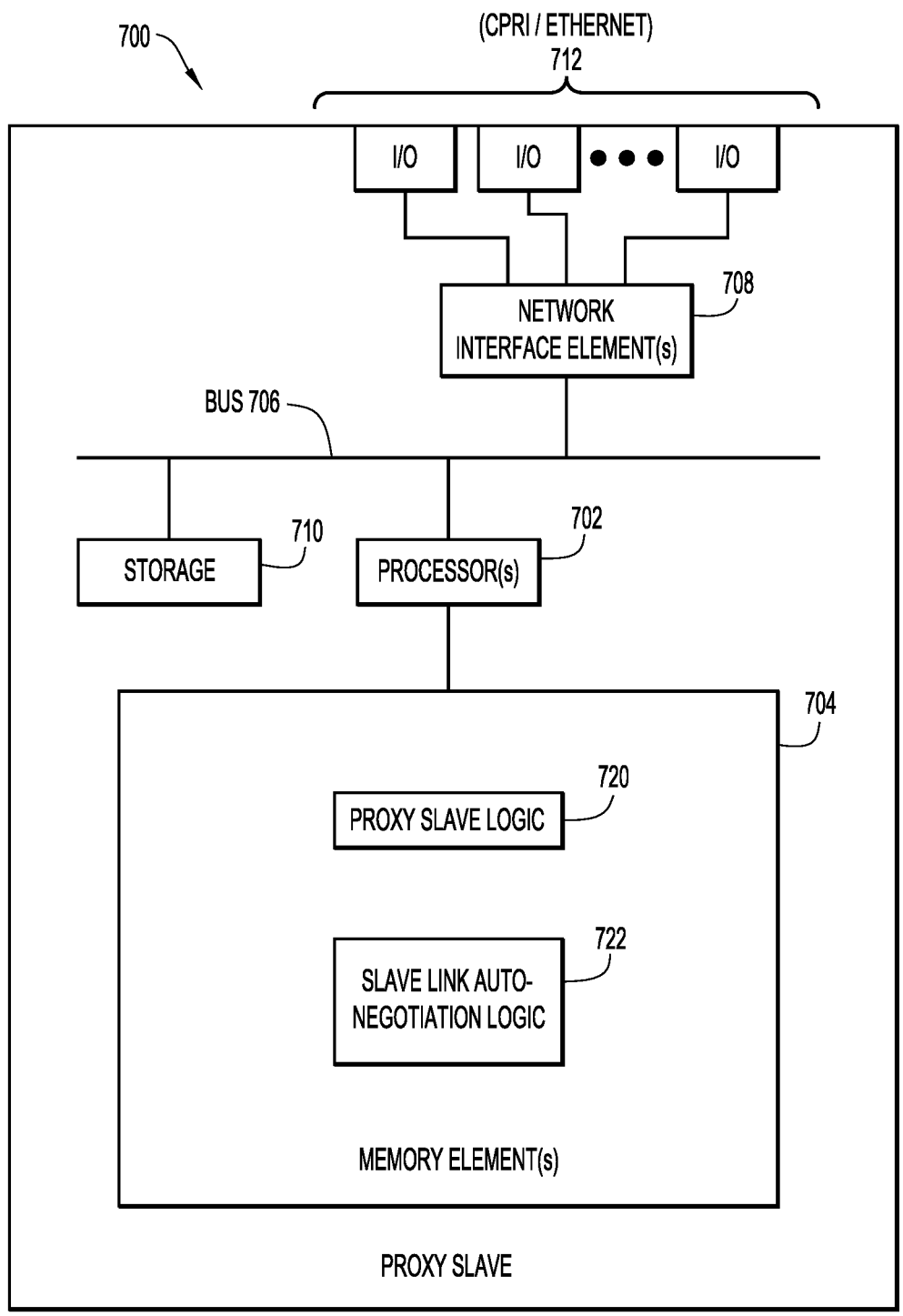
FIG. 6 is a simplified block diagram illustrating example details associated with a Proxy Slave node for implementing operations described herein, according to an example embodiment.

Referring to FIG. 6, FIG. 6 is a simplified block diagram illustrating example details associated with a proxy node such as a Proxy Slave 700 for implementing operations described herein, according to an example embodiment. Proxy Slave 700 may provide operations associated with a Proxy Slave within an Ethernet-based fronthaul network as discussed herein such as, for example, Proxy Slave 230 of Ethernet-based fronthaul network 200, as illustrated in FIG. 2.

The embodiment of FIG. 6 illustrates Proxy Slave 700, which includes one or more processor(s) 702, one or more memory element(s) 704, a bus 706, one or more network interface element(s) 708, and storage 710. Memory element(s) 704 may include instructions for proxy slave logic 720 and slave link auto-negotiation logic 722.

In at least one embodiment, processor(s) 702 is/are at least one hardware processor configured to execute various tasks, operations, and/or functions for Proxy Slave 700 according to software and/or instructions configured for Proxy Slave 700. In at least one embodiment, memory element(s) 704 is/are configured to store data, information, software and/or instructions associated with Proxy Slave 700 and logic configured for memory element(s) 704. In at least one embodiment, bus 706 can be configured as an interface that enables one or more elements of Proxy Slave 700 (e.g., network interface element(s) 708, processor(s) 702, memory element(s) 704 (and logic, etc. configured therein), etc.) to communicate in order to exchange information and/or data, to perform operations, etc. In at least one embodiment, a fast kernel-hosted interconnect may be employed for Proxy Slave 700, potentially using shared memory between processes (e.g., logic, etc.), which can enable efficient communication paths between the processes.

In various embodiments, network interface element(s) 708 enables communications (wired or wireless) between Proxy Slave 700 and other network elements or nodes, via one or more input/output (I/O) elements 712 (e.g., any number/combination of CPRI ports, Ethernet ports, transceivers, etc.) at which data, information, etc. is received and transmitted to facilitate operations discussed for various embodiments described herein. In various embodiments, network interface element(s) 708 (e.g., hardware, software, firmware, logic, etc.) can be configured to include any combination of Ethernet interface elements, CPRI interface elements, RF interface elements (e.g., for WiFi or any other unlicensed spectrum communications, for 3GPP or any other licensed spectrum communications, and/or or any other similar network interface elements to enable communications (e.g., CPRI bit stream/RoE frame mapping/de-mapping, Ethernet frame encapsulation/de-encapsulation, etc.) for Proxy Slave 700 within an Ethernet-based fronthaul network (e.g., Ethernet-based fronthaul network 200). Proxy Slave 700 can include any suitable interfaces for receiving, transmitting, and/or otherwise communicating data and/or information in a network environment.

In various embodiments, storage 710 can be configured to store data, information and/or instructions associated with Proxy Slave 700 and/or logic configured for memory element(s) 704. Note that in certain examples, storage 710 can be consolidated with memory elements 704 (or vice versa), and/or the storage/memory elements can overlap/exist in any other suitable manner.

In various embodiments, proxy slave logic 720 can include instructions that, when executed (e.g., by processor(s) 702) cause Proxy Slave 700 to perform operations, which can include, but not be limited to: performing control, management, etc. operations associated with Proxy Slave 700 (e.g., for CPRI bit steam/RoE frame mapping/de-mapping operations, Ethernet frame encapsulations/de-encapsulations, monitoring operations, and/or any other normal operations); cooperating and/or interacting with other logic (internal and/or external to Proxy Slave 700) and/or network interface element(s) 708 (e.g., for CPRI bit stream/RoE frame mapping/de-mapping operations, Ethernet frame encapsulations/de-encapsulations, monitoring operations, and/or any other normal operations); maintaining and/or interacting with stored data, information, and/or parameters (e.g., link bit rates); combinations thereof; and/or the like to facilitate operations as discussed for various embodiments described herein.

In various embodiments, slave link auto-negotiation logic 722 may include instructions that, when executed (e.g., by processor(s) 702) may facilitate various link-auto negotiation operations described herein including, but not limited to: operations associated with distributed state machine 300 for a Proxy Slave; sending/receiving out-of-band communications as a Proxy Slave via the RoE Management Protocol described herein; cooperating and/or interacting with other logic (internal and/or external to Proxy Slave 700) and/or network interface element(s) 708; maintaining and/or interacting with stored data, information, and/or parameters; combinations thereof; and/or the like to facilitate operations as discussed for various embodiments described herein.

In various embodiments, memory element(s) 704 may include any suitable memory element such as RAM, DRAM, SRAM, and/or cache memory. In general, memory element(s) 704 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 710 may include any suitable storage such as persistent storage, which may be a magnetic disk drive, a solid state hard drive, a semiconductor storage device, ROM, an EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 710 may also be removable. For example, a removable hard drive may be used for storage 710. Other examples include optical and magnetic disks, thumb drives, and smart cards that are inserted into a drive for transfer onto another computer readable storage medium that is also part of storage 710.

Figure 7:
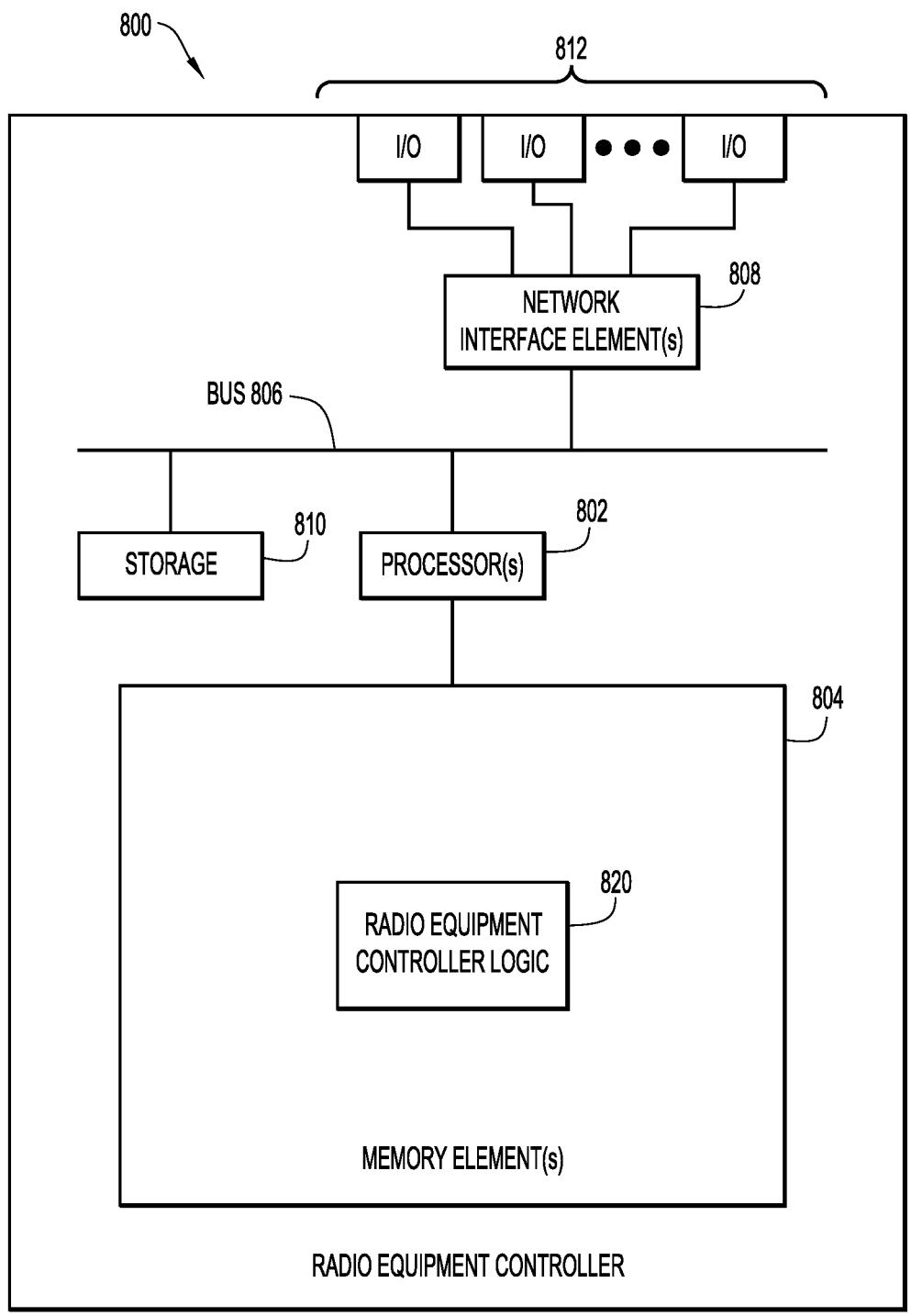
FIG. 7 is a simplified block diagram illustrating example details associated with a radio equipment controller for implementing operations described herein, according to an example embodiment.

Referring to FIG. 7, FIG. 7 is a simplified block diagram illustrating example details associated with a radio equipment controller 800 for implementing operations described herein, according to an example embodiment. In at least one embodiment, radio equipment controller 800 may provide operations associated with a radio equipment controller within an Ethernet-based fronthaul network as discussed herein such as, for example, REC 210 of Ethernet-based fronthaul network 200, as illustrated in FIG. 2.

The embodiment of FIG. 7 illustrates radio equipment controller 800, which includes one or more processor(s) 802, one or more memory element(s) 804, a bus 806, one or more network interface element(s) 808, and storage 810. Memory element(s) 804 may include instructions for radio equipment controller logic 820.

In at least one embodiment, processor(s) 802 is/are at least one hardware processor configured to execute various tasks, operations, and/or functions for radio equipment controller 800 according to software and/or instructions configured for radio equipment controller 800. In at least one embodiment, memory element(s) 804 is/are configured to store data, information, software and/or instructions associated with radio equipment controller 800 and logic configured for memory element(s) 804. In at least one embodiment, bus 806 can be configured as an interface that enables one or more elements of radio equipment controller 800 (e.g., network interface element(s) 808, processor(s) 802, memory element(s) 804 (and logic, etc. configured therein), etc.) to communicate in order to exchange information and/or data, to perform operations, etc. In at least one embodiment, a fast kernel-hosted interconnect may be employed for radio equipment controller 800, potentially using shared memory between processes (e.g., logic, etc.), which can enable efficient communication paths between the processes.

In various embodiments, network interface element(s) 808 enables communications (wired or wireless) between radio equipment controller 800 and other network elements or nodes, via one or more input/output (I/O) elements 812 (e.g., any number/combination of CPRI ports, Ethernet ports, transceivers, etc.) at which data, information, etc. is received and transmitted to facilitate operations discussed for various embodiments described herein. In various embodiments, network interface element(s) 808 (e.g., hardware, software, firmware, logic, etc.) can be configured to include Ethernet interface elements, CPRI interface elements, RF interface elements (e.g., for WiFi or any other unlicensed spectrum communications, for 3GPP or any other licensed spectrum communications, and/or or any other similar network interface elements to enable communications for radio equipment controller 800 within an Ethernet-based fronthaul network (e.g., Ethernet-based fronthaul network 200). Radio equipment controller 800 can include any suitable interfaces for receiving, transmitting, and/or otherwise communicating data and/or information in a network environment.

In various embodiments, storage 810 can be configured to store data, information and/or instructions associated with radio equipment controller 800 and/or logic configured for memory element(s) 804. Note that in certain examples, storage 810 can be consolidated with memory elements 804 (or vice versa), and/or the storage/memory elements can overlap/exist in any other suitable manner.

In various embodiments, radio equipment controller logic 820 can include instructions that, when executed (e.g., by processor(s) 802) cause radio equipment controller 800 to perform operations, which can include, but not be limited to: performing control, management, etc. operations associated with radio equipment controller 800 (e.g., CPRI link negotiation operations, radio equipment controller operations, and/or any other normal operations); cooperating and/or interacting with other logic (internal and/or external to radio equipment controller 800) and/or network interface element(s) 808 (e.g., for CPRI link negotiation operations, radio equipment controller operations, and/or any other normal operations); maintaining and/or interacting with stored data, information, and/or parameters (e.g., link bit rates); combinations thereof; and/or the like to facilitate operations as discussed for various embodiments described herein.

In various embodiments, memory element(s) 804 may include any suitable memory element such as RAM, DRAM, SRAM, and/or cache memory. In general, memory element(s) 804 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 810 may include any suitable storage such as persistent storage, which may be a magnetic disk drive, a solid state hard drive, a semiconductor storage device, ROM, EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 810 may also be removable. For example, a removable hard drive may be used for storage 810. Other examples include optical and magnetic disks, thumb drives, and smart cards that are inserted into a drive for transfer onto another computer readable storage medium that is also part of storage 810.

Figure 8:
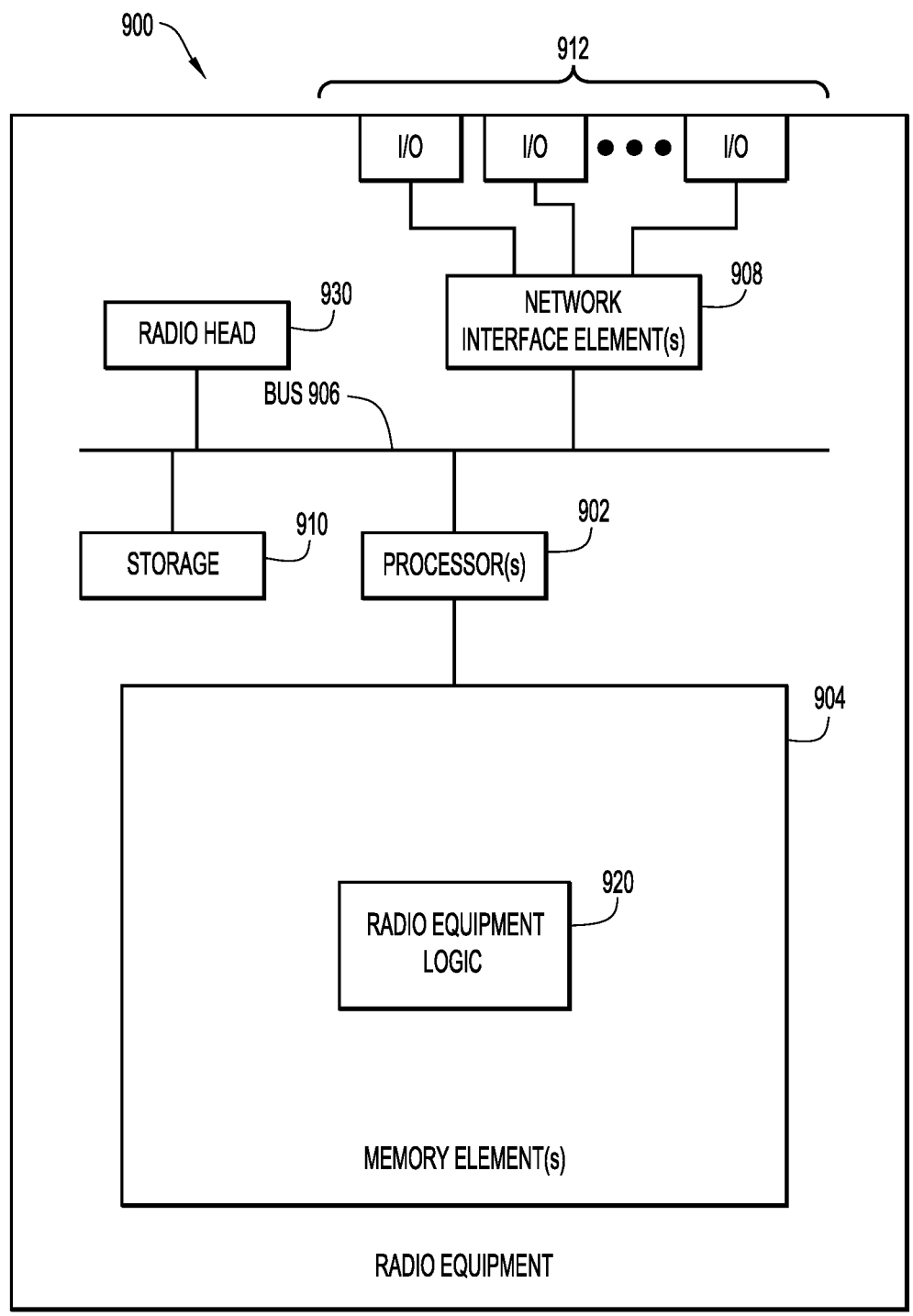
FIG. 8 is a simplified block diagram illustrating example details associated with a radio equipment for implementing operations described herein, according to an example embodiment.

Referring to FIG. 8, FIG. 8 is a simplified block diagram illustrating example details associated with a radio equipment 900 for implementing operations described herein, according to an example embodiment. In at least one embodiment, radio equipment 900 may provide operations associated with radio equipment within an Ethernet-based fronthaul network as discussed herein such as, for example, RE 220 of Ethernet-based fronthaul network 200, as illustrated in FIG. 2.

The embodiment of FIG. 8 illustrates radio equipment 900, which includes one or more processor(s) 902, one or more memory element(s) 904, a bus 906, one or more network interface element(s) 908, storage 910, and a radio head 930. Memory element(s) 904 may include instructions for radio equipment 920. In at least one embodiment, radio head 930 can include circuitry, hardware, antennas, software, firmware, combinations thereof, and/or the like to provide one or more radio transmitters and receivers to facilitate over-the-air radio access connectivity for user equipment.

In at least one embodiment, processor(s) 902 is/are at least one hardware processor configured to execute various tasks, operations, and/or functions for radio equipment 900 according to software and/or instructions configured for radio equipment 900. In at least one embodiment, memory element(s) 904 is/are configured to store data, information, software and/or instructions associated with radio equipment 900 and logic configured for memory element(s) 904. In at least one embodiment, bus 906 can be configured as an interface that enables one or more elements of radio equipment 900 (e.g., network interface element(s) 908, processor(s) 902, memory element(s) 904 (and logic, etc. configured therein), radio head 930, etc.) to communicate in order to exchange information and/or data, to perform operations, etc. In at least one embodiment, a fast kernel-hosted interconnect may be employed for radio equipment 900, potentially using shared memory between processes (e.g., logic, etc.), which can enable efficient communication paths between the processes.

In various embodiments, network interface element(s) 908 enables communications (wired or wireless) between radio equipment 900 and other network elements or nodes, via one or more input/output (I/O) elements 912 (e.g., any number/combination of CPRI ports, Ethernet ports, transceivers, etc.) at which data, information, etc. is received and transmitted to facilitate operations discussed for various embodiments described herein. In various embodiments, network interface element(s) 908 (e.g., hardware, software, firmware, logic, etc.) can be configured to include Ethernet interface elements, CPRI interface elements, RF interface elements (e.g., for WiFi or any other unlicensed spectrum communications, for 3GPP or any other licensed spectrum communications, and/or or any other similar network interface elements to enable communications for radio equipment 900 within an Ethernet-based fronthaul network (e.g., Ethernet-based fronthaul network 200). Radio equipment 900 can include any suitable interfaces for receiving, transmitting, and/or otherwise communicating data and/or information in a network environment.

In various embodiments, storage 910 can be configured to store data, information and/or instructions associated with radio equipment 900 and/or logic configured for memory element(s) 904. Note that in certain examples, storage 910 can be consolidated with memory elements 904 (or vice versa), and/or the storage/memory elements can overlap/exist in any other suitable manner.

In various embodiments, radio equipment logic 920 can include instructions that, when executed (e.g., by processor(s) 902) cause radio equipment 900 to perform operations, which can include, but not be limited to: performing control, management, etc. operations associated with radio equipment 900 (e.g., CPRI link negotiation operations, radio equipment operations, and/or any other normal operations); cooperating and/or interacting with other logic (internal and/or external to radio equipment 900) and/or network interface element(s) 908 (e.g., for CPRI link negotiation operations, radio equipment operations, and/or any other normal operations); maintaining and/or interacting with stored data, information, and/or parameters (e.g., link bit rates); combinations thereof; and/or the like to facilitate operations as discussed for various embodiments described herein.

In various embodiments, memory element(s) 904 may include any suitable memory element such as RAM, DRAM, SRAM, and/or cache memory. In general, memory element(s) 904 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 910 may include any suitable storage such as persistent storage, which may be a magnetic disk drive, a solid state hard drive, a semiconductor storage device, ROM, an EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 910 may also be removable. For example, a removable hard drive may be used for storage 910. Other examples include optical and magnetic disks, thumb drives, and smart cards that are inserted into a drive for transfer onto another computer readable storage medium that is also part of storage 910.

In summary, presented herein are techniques that provide a method to achieve link auto-negotiation between an REC and RE in an Ethernet-based fronthaul network, in at least one embodiment. Due to the adoption of massive Multiple-Input Multiple-Output (MIMO) technologies and huge bandwidth requirements for 5G communication, current deployments for LTE, LTE-Advanced, LTE-Advanced Pro and new 5G technology based deployments need to move to packetized fronthaul based networks. The existing deployments of these technologies where CPRI technology is used for interconnection between REC and RE should also work in Ethernet-based packetized fronthaul networks, i.e., the CPRI streams need to be packetized and sent over the packet network towards the other CPRI end point in packets where the CPRI stream will be extracted again and passed to the actual CPRI end point (REC/RE). This allows for better adoption of 5G in the already existing network deployments.

While, the IEEE 1914.1 and IEEE 1914.3 Specifications are the standards for packet-based fronthaul transport networks; these standards do not cover how end-to-end link negotiations can happen between REC and RE in the fronthaul networks. Embodiments herein provide techniques to solve this above gap. For example, a network operator can deploy CPRI-based REC and/or RE units of varied capabilities in fronthaul network and the techniques discussed for embodiments herein can be used to achieve end-to-end CPRI link synchronization, which otherwise would require static manual configurations at each CPRI interface which is error prone, inefficient at times, and not scalable.

In one form, a computer-implemented method is provided. In at least one embodiment, the computer-implemented method may include (a) performing, by a proxy master, a Common Public Radio Interface (CPRI) Layer 1 (L1) link auto-negotiation with a radio equipment to achieve a L1 synchronization between the proxy master and the radio equipment at a link bit rate; (b) communicating the link bit rate from the proxy master to a proxy slave, wherein the communicating is performed via an Ethernet network; (c) performing, by the proxy slave, a CPRI L1 link auto-negotiation with a radio equipment controller to determine whether a L1 synchronization between the proxy slave and the radio equipment controller is achieved using the link bit rate received from the proxy master, wherein if the L1 synchronization is achieved between the proxy slave and the radio equipment controller, the link bit rate is a common matching link bit rate achieved among the radio equipment controller, the proxy slave, the proxy master, and the radio equipment; and (d) upon the common matching link bit rate being achieved, establishing a CPRI link between the radio equipment controller and the radio equipment using the common matching link bit rate.

The method may further include based on determining that the L1 synchronization between the proxy slave and the radio equipment controller is not achieved using the link bit rate, communicating an indication from the proxy slave to the proxy master via the Ethernet network that the L1 synchronization between the proxy slave and the radio equipment controller was not achieved; and repeating (a), (b), and (c) using a plurality of other link bit rates until the common matching link bit rate is achieved among the radio equipment controller, the proxy slave, the proxy master, and the radio equipment.

Communicating the indication from the proxy slave to the proxy master may include communicating the indication from the proxy slave to the proxy master using an out-of-band control channel between the proxy slave and the proxy master. Communicating the link bit rate from the proxy master to a proxy slave may further include communicating the link bit rate from the proxy master to the proxy slave using an out-of-band control channel between the proxy master and the proxy slave.

Performing the CPRI L1 link auto-negotiation with the radio equipment by the proxy master may further include resetting a CPRI link between the proxy master and the radio equipment after the L1 synchronization between the proxy master and the radio equipment is achieved.

Performing the CPRI L1 link auto-negotiation with the radio equipment controller by the proxy slave may further include determining, by the proxy slave, whether a hyper frame number synchronization between the proxy slave and the radio equipment controller is achieved using the link bit rate for a CPRI bit stream received from the radio equipment controller at the link bit rate; transmitting, by the proxy slave, a CPRI bit stream towards the radio equipment controller using only the link bit rate received from the proxy master upon determining the hyper frame number synchronization; and stopping the transmitting by the proxy slave after 10 hyper frames.

Based on determining that the L1 synchronization between the proxy slave and the radio equipment controller is achieved using the link bit rate, the method may further include communicating an indication from the proxy slave to the proxy master to allow CPRI link auto-negotiation operations to be performed between the radio equipment controller and the radio equipment to establish the CPRI link between the radio equipment controller and the radio equipment using the common matching link bit rate while the proxy master and the proxy master perform passive link monitoring operations, mapping operations, and de-mapping operations.

In at least one embodiment, the link monitoring operations may include monitoring, by the proxy master and the proxy slave, for CPRI L1 link faults or a CPRI link reset; and based on detecting a CPRI L1 link fault or a CPRI link reset, repeating (a), (b), (c) until the common matching link bit rate is known among the radio equipment controller, the proxy slave, the proxy master, and the radio equipment.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, network element, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, personal digital assistant (PDA), mobile devices, etc.), and may include any commercially available operating system and any combination of commercially available and custom software (e.g., machine learning software, etc.). These systems may include any types of monitors and input/output devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), a field programmable gate array (FPGA), in digital signal processing (DSP) instructions, firmware, software [potentially inclusive of object code and source code] to be executed by a processor, or other similar machine, etc.). In some of these instances, a memory element or storage can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., an FPGA, a DSP processor, an EPROM, a controller, an electrically erasable PROM (EEPROM), or an ASIC that includes digital logic, software, firmware, code, electronic instructions, or any suitable combination thereof.

In one example implementation, a network element can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for networks such as discussed herein).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Elements and/or systems discussed for various embodiments described herein can couple to one another through simple interfaces (as illustrated) and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, networks can represent a series of points or elements of interconnected communication paths (wired or wireless) for receiving and transmitting packets of information that propagate through networks. In various embodiments, networks can be associated with and/or provided by a single network operator or service provider and/or multiple network operators or service providers. In various embodiments, networks can include and/or overlap with, in whole or in part, one or more packet data network(s). A network may offer communicative interfaces between various elements of the network and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment Networks through which communications propagate in can use any suitable technologies for communication including wireless (e.g., 3G/4G/5G/NG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein, can be inclusive of an executable file comprising instructions that can be understood and processed on a computer, processor, machine, network element, compute node, combinations thereof, or the like and may further include library modules loaded during execution, object files, system files, hardware logic, software logic, and/or any other executable modules.

The embodiments presented may be implemented in various forms, such as an apparatus, a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding figures illustrate only some of the possible scenarios that may be executed by, or within, a system or network. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
   (a) performing, by a proxy master, a Common Public Radio Interface (CPRI) Layer 1 (L1) link auto-negotiation with a radio equipment to achieve a L1 synchronization between the proxy master and the radio equipment at a link bit rate;
   (b) communicating the link bit rate from the proxy master to a proxy slave, wherein the communicating is performed via an Ethernet network;
   (c) performing, by the proxy slave, a CPRI L1 link auto-negotiation with a radio equipment controller to determine whether a L1 synchronization between the proxy slave and the radio equipment controller is achieved using the link bit rate received from the proxy master;
   (d) based on determining that the L1 synchronization between the proxy slave and the radio equipment controller is not achieved using the link bit rate, communicating an indication from the proxy slave to the proxy master via the Ethernet network that the L1 synchronization between the proxy slave and the radio equipment controller was not achieved and repeating (a), (b), and (c) using a plurality of other link bit rates until a common matching link bit rate is achieved among the radio equipment controller, the proxy slave, the proxy master, and the radio equipment; and
   (e) upon the common matching link bit rate being achieved, establishing a CPRI link between the radio equipment controller and the radio equipment using the common matching link bit rate.

2. The method of claim 1, wherein communicating the indication from the proxy slave to the proxy master further comprises:
   communicating the indication from the proxy slave to the proxy master using an out-of-band control channel between the proxy slave and the proxy master.

3. The method of claim 1, wherein communicating the link bit rate from the proxy master to a proxy slave further comprises:
   communicating the link bit rate from the proxy master to the proxy slave using an out-of-band control channel between the proxy master and the proxy slave.

4. The method of claim 1, wherein performing the CPRI L1 link auto-negotiation with the radio equipment by the proxy master further comprises:
   resetting a CPRI link between the proxy master and the radio equipment after the L1 synchronization between the proxy master and the radio equipment is achieved.

5. The method of claim 1, wherein performing the CPRI L1 link auto-negotiation with the radio equipment controller by the proxy slave further comprises:
   determining, by the proxy slave, whether a hyper frame number synchronization between the proxy slave and the radio equipment controller is achieved using the link bit rate for a CPRI bit stream received from the radio equipment controller at the link bit rate;
   transmitting, by the proxy slave, a CPRI bit stream towards the radio equipment controller using only the link bit rate received from the proxy master upon determining the hyper frame number synchronization; and
   stopping the transmitting by the proxy slave after 10 hyper frames.

6. The method of claim 1, wherein based on determining that the L1 synchronization between the proxy slave and the radio equipment controller is achieved using the link bit rate, the method further comprising:
communicating an indication from the proxy slave to the proxy master to allow CPRI link auto-negotiation operations to be performed between the radio equipment controller and the radio equipment to establish the CPRI link between the radio equipment controller and the radio equipment using the common matching link bit rate while the proxy master and the proxy master slave perform passive link monitoring operations, mapping operations, and de-mapping operations.

7. The method of claim 6, wherein the passive link monitoring operations comprise:
monitoring, by the proxy master and the proxy slave, for CPRI LI link faults or a CPRI link reset; and
based on detecting a CPRI L1 link fault or a CPRI link reset, repeating (a), (b), and (c) until the common matching link bit rate is known among the radio equipment controller, the proxy slave, the proxy master, and the radio equipment.

8. A plurality of non-transitory computer readable storage media encoded with instructions that, when executed by a plurality of processors, cause the plurality of processors to perform operations, comprising:
(a) performing, by a proxy master, a Common Public Radio Interface (CPRI) Layer 1 (L1) link auto-negotiation with a radio equipment to achieve a L1 synchronization between the proxy master and the radio equipment at a link bit rate;
(b) communicating the link bit rate from the proxy master to a proxy slave, wherein the communicating is performed via an Ethernet network;
(c) performing, by the proxy slave, a CPRI L1 link auto-negotiation with a radio equipment controller to determine whether a L1 synchronization between the proxy slave and the radio equipment controller is achieved using the link bit rate received from the proxy master;
(d) based on determining that the L1 synchronization between the proxy slave and the radio equipment controller is not achieved using the link bit rate, communicating an indication from the proxy slave to the proxy master via the Ethernet network that the L1 synchronization between the proxy slave and the radio equipment controller was not achieved and repeating (a), (b), and (c) using a plurality of other link bit rates until a common matching link bit rate is achieved among the radio equipment controller, the proxy slave, the proxy master, and the radio equipment; and
(e) upon the common matching link bit rate being achieved, establishing a CPRI link between the radio equipment controller and the radio equipment using the common matching link bit rate.

9. The media of claim 8, wherein communicating the indication from the proxy slave to the proxy master further comprises:
communicating the indication from the proxy slave to the proxy master using an out-of-band control channel between the proxy slave and the proxy master.

10. The media of claim 8, wherein communicating the link bit rate from the proxy master to a proxy slave further comprises:
communicating the link bit rate from the proxy master to the proxy slave using an out-of-band control channel between the proxy master and the proxy slave.

11. The media of claim 8, wherein performing the CPRI L1 link auto-negotiation with the radio equipment by the proxy master further comprises:
resetting a CPRI link between the proxy master and the radio equipment after the L1 synchronization between the proxy master and the radio equipment is achieved.

12. The media of claim 8, wherein performing the CPRI L1 link auto-negotiation with the radio equipment controller by the proxy slave further comprises:
determining, by the proxy slave, whether a hyper frame number synchronization between the proxy slave and the radio equipment controller is achieved using the link bit rate for a CPRI bit stream received from the radio equipment controller at the link bit rate;
transmitting, by the proxy slave, a CPRI bit stream towards the radio equipment controller using only the link bit rate received from the proxy master upon determining the hyper frame number synchronization; and
stopping the transmitting by the proxy slave after 10 hyper frames.

13. The media of claim 8, wherein based on determining that the L1 synchronization between the proxy slave and the radio equipment controller is achieved using the link bit rate, the operations further comprising:
communicating an indication from the proxy slave to the proxy master to allow CPRI link auto-negotiation operations to be performed between the radio equipment controller and the radio equipment to establish the CPRI link between the radio equipment controller and the radio equipment using the common matching link bit rate while the proxy master and the proxy master slave perform passive link monitoring operations, mapping operations, and de-mapping operations.

14. A system comprising:
a plurality of memory elements for storing data; and
a plurality of processors for executing instructions associated with the data, wherein executing the instructions causes the system to perform operations, comprising:
(a) performing, by a proxy master, a Common Public Radio Interface (CPRI) Layer 1 (L1) link auto-negotiation with a radio equipment to achieve a synchronization between the proxy master and the radio equipment at a link bit rate;
(b) communicating the link bit rate from the proxy master to a proxy slave, wherein the communicating is performed via an Ethernet network;
(c) performing, by the proxy slave, a CPRI L1 link auto-negotiation with a radio equipment controller to determine whether a L1 synchronization between the proxy slave and the radio equipment controller is achieved using the link bit rate received from the proxy master;
(d) based on determining that the L1 synchronization between the proxy slave and the radio equipment controller is not achieved using the link bit rate, communicating an indication from the proxy slave to the proxy master via the Ethernet network that the L1 synchronization between the proxy slave and the radio equipment controller was not achieved and repeating (a), (b), and (c) using a plurality of other link bit rates until a common matching link bit rate is achieved among the radio equipment controller, the proxy slave, the proxy master, and the radio equipment; and
(e) upon the common matching link bit rate being achieved, establishing a CPRI link between the radio equipment controller and the radio equipment using the common matching link bit rate.

15. The system of claim 14, wherein communicating the link bit rate from the proxy master to a proxy slave further comprises:
communicating the link bit rate from the proxy master to the proxy slave using an out-of-band control channel between the proxy master and the proxy slave.

16. The system of claim 14, wherein performing the CPRI L1 link auto-negotiation with the radio equipment by the proxy master further comprises:
resetting a CPRI link between the proxy master and the radio equipment after the L1 synchronization between the proxy master and the radio equipment is achieved.

17. The system of claim 14, wherein performing the CPRI L1 link auto-negotiation with the radio equipment controller by the proxy slave further comprises:
determining, by the proxy slave, whether a hyper frame number synchronization between the proxy slave and the radio equipment controller is achieved using the link bit rate for a CPRI bit stream received from the radio equipment controller at the link bit rate;
transmitting, by the proxy slave, a CPRI bit stream towards the radio equipment controller using only the link bit rate received from the proxy master upon determining the hyper frame number synchronization; and
stopping the transmitting by the proxy slave after 10 hyper frames.

18. The system of claim 14, wherein communicating the indication from the proxy slave to the proxy master further comprises:
communicating the indication from the proxy slave to the proxy master using an out-of-band control channel between the proxy slave and the proxy master.

19. The system of claim 14, wherein based on determining that the L1 synchronization between the proxy slave and the radio equipment controller is achieved using the link bit rate, executing the instructions causes the system to perform further operations, comprising:
communicating an indication from the proxy slave to the proxy master to allow CPRI link auto-negotiation operations to be performed between the radio equipment controller and the radio equipment to establish the CPRI link between the radio equipment controller and the radio equipment using the common matching link bit rate while the proxy master and the proxy slave perform passive link monitoring operations, mapping operations, and de-mapping operations.

20. The system of claim 19, wherein the passive link monitoring operations comprise: monitoring, by the proxy master and the proxy slave, for CPRI L1 link faults or a CPRI link reset; and based on detecting a CPRI L1 link fault or a CPRI link reset, repeating (a), (b), and (c) until the common matching link bit rate is known among the radio equipment controller, the proxy slave, the proxy master, and the radio equipment.

* * * * *

UNITED STATES PATENT AND TRADEMARK OFFICE
CERTIFICATE OF CORRECTION

PATENT NO. : 11,228,991 B2
APPLICATION NO. : 16/435946
DATED : January 18, 2022
INVENTOR(S) : Prashant Anand et al.

Page 1 of 1

It is certified that error appears in the above-identified patent and that said Letters Patent is hereby corrected as shown below:

In the Claims

Claim 6, Column 29, Line 11-12, please remove "master" before -- slave perform passive --

Claim 7, Column 29, Line 17, please replace "CPRI LI link faults" with -- CPRI L1 link faults --

Claim 13, Column 30, Line 32-33, please remove "master" before -- slave perform passive --

Claim 14, Column 30, Line 42-43, please replace "to achieve a synchronization" with -- to achieve a L1 synchronization --

Signed and Sealed this
Thirty-first Day of May, 2022

Katherine Kelly Vidal
*Director of the United States Patent and Trademark Office*